(12) United States Patent
Chien et al.

(10) Patent No.: US 10,148,363 B2
(45) Date of Patent: Dec. 4, 2018

(54) ITERATIVE NONLINEAR COMPENSATION

(71) Applicant: ZTE Corporation, Shenzhen (CN)

(72) Inventors: Hung-Chang Chien, Bridgewater, NJ (US); Zhensheng Jia, Louisville, CO (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/372,326

(22) Filed: Dec. 7, 2016

(65) Prior Publication Data

US 2017/0163350 A1    Jun. 8, 2017

Related U.S. Application Data

(60) Provisional application No. 62/264,590, filed on Dec. 8, 2015.

(51) Int. Cl.
  *H04B 10/00*    (2013.01)
  *H04B 10/61*    (2013.01)

(52) U.S. Cl.
  CPC ..... *H04B 10/6162* (2013.01); *H04B 10/6166* (2013.01)

(58) Field of Classification Search
  CPC .................. H04B 10/6162; H04B 10/6166
  USPC ........................................................ 398/208
  See application file for complete search history.

(56) References Cited

U.S. PATENT DOCUMENTS

| | | |
|---|---|---|
| 3,845,390 A | 10/1974 | De Jager et al. |
| 4,995,057 A | 2/1991 | Chung |
| 5,161,044 A | 11/1992 | Nazarathy et al. |
| 5,321,725 A * | 6/1994 | Paik ............... H04L 1/0057 348/155 |
| 5,361,156 A | 11/1994 | Pidgeon |
| 5,424,680 A | 6/1995 | Nazarathy et al. |
| 6,016,374 A | 1/2000 | Adams et al. |

(Continued)

OTHER PUBLICATIONS

Buchali, F., et al., "Implementation of 64QAM at 42.66 GBaud Using 1.5 Samples per Symbol DAC and Demonstration of up to 300 km Fiber Transmission," Optical Fiber Communication Conference, OSA Technical Digest (online) (Optical Society of America, 2014), San Francisco, California USA, Paper M2A.1, pp. 1-3, Mar. 2014.

(Continued)

*Primary Examiner* — Juan A Torres
(74) *Attorney, Agent, or Firm* — Perkins Coie LLP

(57) ABSTRACT

A method of optical communication, implemented at a receiver in an optical communication network, includes receiving an optical signal carrying modulated information bits, processing the optical signal through a receiver subsystem to generate a stream of digitized modulation symbols from the optical signal, and producing, using the digitized modulation symbols as input symbols to an iterative process, estimates of information bits. Each iteration includes: generating estimated output symbols from input symbols by filtering by an estimate of inverse of the optical channel, updating, using the estimated output symbols, the estimate of the inverse of the optical channel to minimize a measure of error, and compensating the estimated output symbols by using pre-distortion values from a look-up table (LUT) to generate compensated output symbols that are used as input to a next iteration.

20 Claims, 19 Drawing Sheets

(56) References Cited

U.S. PATENT DOCUMENTS

| | | | |
|---|---|---|---|
| 6,144,711 | A | 11/2000 | Raleigh et al. |
| 6,285,859 | B1 | 9/2001 | Fernandez Duran et al. |
| 6,516,025 | B1 | 2/2003 | Warke et al. |
| 6,687,466 | B1 | 2/2004 | Chiappetta |
| 6,889,060 | B2 | 5/2005 | Fernando et al. |
| 6,961,314 | B1 | 11/2005 | Quigley et al. |
| 7,062,177 | B1 | 6/2006 | Grivna et al. |
| 7,082,253 | B2 | 7/2006 | Dominic et al. |
| 7,092,638 | B2 | 8/2006 | Funami et al. |
| 7,209,664 | B1 | 4/2007 | McNicol et al. |
| 7,317,769 | B2 | 1/2008 | Tonietto et al. |
| 7,321,612 | B2 | 1/2008 | Tonietto et al. |
| 7,426,350 | B1 | 9/2008 | Sun et al. |
| 7,542,685 | B2 | 6/2009 | Bai et al. |
| 7,587,143 | B2 | 9/2009 | Sinha et al. |
| 7,664,171 | B2 | 2/2010 | Sun et al. |
| 7,684,710 | B2 | 3/2010 | Giaretta |
| 7,835,387 | B2 | 11/2010 | Agazzi et al. |
| 8,041,226 | B2 | 10/2011 | Kato |
| 8,041,233 | B2 | 10/2011 | Hueda et al. |
| 8,285,148 | B2* | 10/2012 | Haunstein .............. H04B 10/60 398/158 |
| 8,295,713 | B2 | 10/2012 | Cai |
| 8,379,709 | B2* | 2/2013 | Hui .................... H04L 25/0228 375/232 |
| 8,666,257 | B2 | 3/2014 | Daghighian et al. |
| 8,693,867 | B2 | 4/2014 | Littler et al. |
| 8,737,840 | B2 | 5/2014 | Nakamoto |
| 8,891,347 | B2 | 11/2014 | Yin |
| 9,137,063 | B2 | 9/2015 | Zerbe et al. |
| 9,698,914 | B2 | 7/2017 | Yu et al. |
| 9,900,189 | B2 | 2/2018 | Zerbe et al. |
| 9,912,500 | B2 | 3/2018 | Yu et al. |
| 2002/0196844 | A1* | 12/2002 | Rafie ................. H04L 25/03038 375/232 |
| 2003/0072382 | A1 | 4/2003 | Raleigh et al. |
| 2003/0081670 | A1 | 5/2003 | Bologna et al. |
| 2006/0127102 | A1 | 6/2006 | Roberts et al. |
| 2007/0147489 | A1 | 6/2007 | Sun et al. |
| 2007/0297803 | A1 | 12/2007 | Peral |
| 2009/0074419 | A1 | 3/2009 | Pappert et al. |
| 2009/0245448 | A1 | 10/2009 | Ran et al. |
| 2010/0046600 | A1 | 2/2010 | Zerbe et al. |
| 2013/0209089 | A1 | 8/2013 | Harley et al. |
| 2013/0272698 | A1 | 10/2013 | Jin et al. |
| 2013/0336139 | A1 | 12/2013 | Phan Huy et al. |
| 2014/0072307 | A1* | 3/2014 | Zamani ................ H04B 10/616 398/79 |
| 2014/0098844 | A1 | 4/2014 | Mobin et al. |
| 2014/0199073 | A1 | 7/2014 | Yu |
| 2014/0328588 | A1 | 11/2014 | Sakai et al. |
| 2015/0222360 | A1* | 8/2015 | Boertjes ........... H04B 10/25073 398/141 |
| 2016/0028577 | A1 | 1/2016 | Yu et al. |
| 2016/0065311 | A1 | 3/2016 | Winzer et al. |
| 2016/0080091 | A1* | 3/2016 | Thesling ............ H04B 10/5561 398/188 |
| 2016/0105297 | A1* | 4/2016 | Yaman .............. H04L 25/03859 398/159 |
| 2016/0164703 | A1 | 6/2016 | Stone et al. |
| 2016/0248540 | A1 | 8/2016 | Yu et al. |
| 2016/0285657 | A1 | 9/2016 | Yu et al. |
| 2017/0170993 | A1 | 6/2017 | Jia et al. |
| 2017/0180055 | A1 | 6/2017 | Yu et al. |
| 2017/0317759 | A1 | 11/2017 | Agazzi et al. |

OTHER PUBLICATIONS

Chien, H.-C., et al., "256-Gb/s Single-Carrier PM-256QAM Implementation Using Coordinated DD-LMS and CMA Equalization," 2015 European Conference on Optical Communication (ECOC), Valencia, Spain, Mo.3.3.2, pp. 1-3, Sep. 2015.

Fludger, C.R.S., "Digital Signal Processing for Coherent Transceivers in Next Generation Optical Networks," 2014 European Conference on Optical Communication (ECOC), Cannes, France, Tu.3.1.1, pp. 1-3, Nov. 2014.

Geyer, J., et al., "Practical Implementation of Higher Order Modulation Beyond 16-QAM," Optical Fiber Communication Conference, OSA Technical Digest (online) (Optical Society of America, 2015), Los Angeles, California USA, Paper Th1B.1, pp. 1-3, Mar. 2015.

Jia, Z., et al., "Performance Analysis of Pre- and Post-Compensation for Bandwidth-Constrained Signal in High-Spectral-Efficiency Optical Coherent Systems," Optical Fiber Communication Conference, OSA Technical Digest (online) (Optical Society of America, 2014), San Francisco, California USA, Paper W3K.3, pp. 1-3, Mar. 2014.

Jia, Z., et al., "Performance Comparison of Dual-Carrier 400G with 8/16/32-QAM Modulation Formats," IEEE Photonics Technology Letters, 27(13):1414-1417, Jul. 2015.

Ke, J., et al., "400 Gbit/s single-carrier and 1 Tbit/s three-carrier superchannel signals using dual polarization 16-QAM with look-up table correction and optical pulse shaping," Optics Express, 22(1):71-83, Jan. 2014.

O'Sullivan, M., et al., "A 400G/1T High Spectral Efficiency Technology and Some Enabling Subsystems," Optical Fiber Communication Conference, OSA Technical Digest (online) (Optical Society of America, 2012), Los Angeles, California USA, Paper OM2H.1, pp. 1-3, Mar. 2012.

Zhang, J., et al., "Transmission of single-carrier 400G signals (515.2-Gb/s) based on 128.8-GBaud PDM QPSK over 10,130- and 6,078 km terrestrial fiber links," Optics Express, 23(13):16540-16545, Jun. 2015.

Zhang, S., et al., "Trans-Pacific Transmission of Quad-Carrier 1Tb/s DP-8QAM Assisted by LUT-based MAP Algorithm," Optical Fiber Communication Conference, OSA Technical Digest (online) (Optical Society of America, 2015), Los Angeles, California USA, Paper W3G.3, pp. 1-3, Mar. 2015.

Zhou, X., et al., "1200km Transmission of 50GHz spaced, 5x504-Gbis PDM-32-64 hybrid QAM using Electrical and Optical Spectral Shaping," Optical Fiber Communication Conference, OSA Technical Digest (online) (Optical Society of America, 2012), Los Angeles, California USA, Paper OM2A.2, pp. 1-3, Mar. 2012.

\* cited by examiner

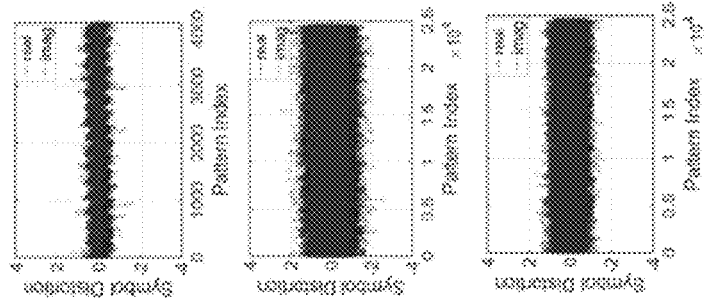
FIG. 13E  FIG. 13F  FIG. 13G
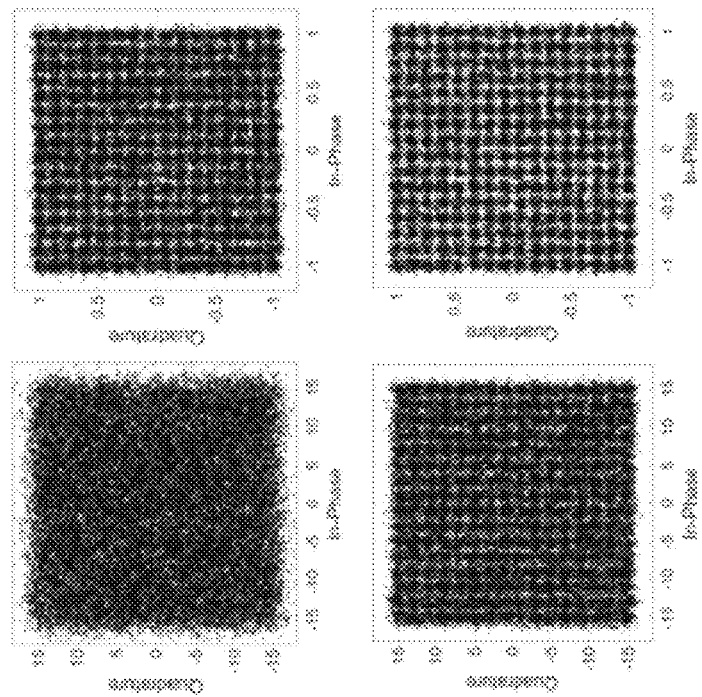
FIG. 13A  FIG. 13C
FIG. 13B  FIG. 13D
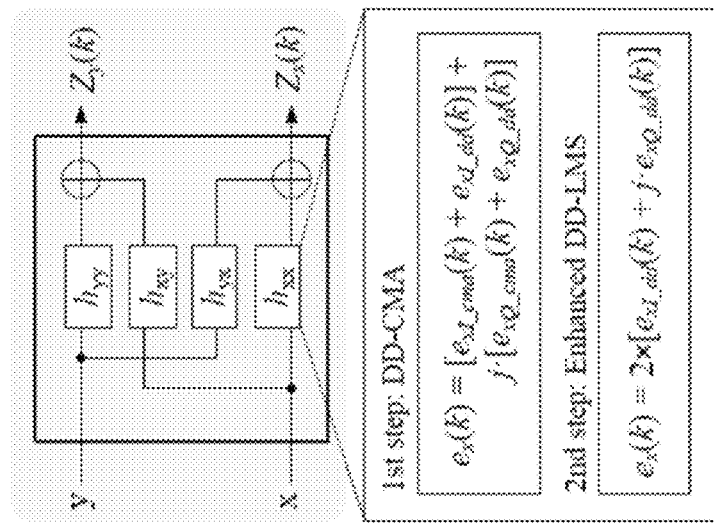
FIG. 13H

ITERATIVE NONLINEAR COMPENSATION

CROSS REFERENCE TO RELATED APPLICATIONS

This patent document claims the benefit of priority of U.S. Provisional Patent Application No. 62/264,590, filed on Dec. 8, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses techniques for compensating nonlinearities in digital communication transmission and reception devices.

In one example aspect, a method of optical communication, implemented at a receiver, is disclosed. The method includes receiving, over an optical channel, an optical signal carrying modulated information bits, processing the optical signal through a receiver subsystem to generate a stream of digitized modulation symbols from the optical signal and producing, using the digitized modulation symbols as input symbols to an iterative process, estimates of information bits. The iterative process includes, in each iteration, generating estimated output symbols from input symbols by filtering by an estimate of inverse of the optical channel, updating, using the estimated output symbols, the estimate of the inverse of the optical channel to minimize a measure of error, and compensating the estimated output symbols by using pre-distortion values from a look-up table (LUT) to generate compensated output symbols that are used as input to a next iteration.

In another example aspect, a receiver apparatus is disclosed. The apparatus includes an optical front end, a receiver subsystem, a memory and a digital signal processor. The optical front end receives an optical signal carrying modulated optical signal from an optical channel. The receiver subsystem processes the optical signal and generates a stream of digitized modulation symbols from the optical signal. The memory stores instructions, which when implemented by the digital signal processor, cause the digital signal processor to generate estimated output symbols from input symbols by filtering by an estimate of inverse of the optical channel, update, using the estimated output symbols, the estimate of the inverse of the optical channel to minimize a measure of error, and compensate the estimated output symbols by using pre-distortion values from a look-up table (LUT) to generate compensated output symbols that are used as input to a next iteration.

In yet another example aspect, an optical communication receiver is disclosed. The receiver includes a first memory on which look up table (LUT) values sorted according to symbol patterns, wherein each LUT value corresponds to an amount of additive correction, are stored, a second memory in which instructions are stored and a processor that reads the instructions from the second memory and implements a data reception method. The instructions include instructions for operating an optical front end to receive, over an optical channel, an optical signal carrying modulated information bits, instructions for operating a receiver subsystem to process the optical signal to generate a stream of digitized modulation symbols from the optical signal, instructions for generating estimated output symbols from input symbols by filtering by an estimate of inverse of the optical channel, instructions for updating, using the estimated output symbols, the estimate of the inverse of the optical channel to minimize a measure of error, and instructions for compensating the estimated output symbols by the amount of additive correction.

These and other aspects, and their implementations and variations are set forth in the drawings, the description and the claims.

BRIEF DESCRIPTION OF THE DRAWINGS

FIG. 13A shows an exemplary x-pol constellation diagram of the 30-GBd PM-256QAM signal with 35-dB ONSR after the 1st step of the T/2-spaced equalization.

FIG. 13B shows an exemplary x-pol constellation diagram of the 30-GBd PM-256QAM signal with 35-dB ONSR after the 2nd step of the T/2-spaced equalization.

FIG. 13C shows an exemplary x-pol constellation diagram with 13-symbol DPD.

FIG. 13D shows an example of the output constellation from 7-symbol LUT nonlinearity post-compensation with two times of iteration contributed a valuable processing gain of 0.73 dB.

FIG. 13E shows an example of obtained x-pol LUTs with memory lengths of 3 symbols.

FIG. 13F shows an example of obtained x-pol LUTs with memory lengths of 13 symbols.

FIG. 13G shows an exemplary x-pol constellation diagram with 13-symbol LUT after the DPD confirms the nonlinearity suppression.

FIG. 13H shows an exemplary conceptual diagram of a two-step polarization-tracking blind equalizer, and the received constellations and LUT.

DETAILED DESCRIPTION

In this patent document, the word "exemplary" is used to mean serving as an example, instance, or illustration. Any embodiment or configuration described herein as "exemplary" is not necessarily to be construed as preferred or advantageous over other embodiments or configurations. Rather, use of the word exemplary is intended to present concepts in a concrete manner.

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain, e.g., using photonic signal processing.

Figure 1:
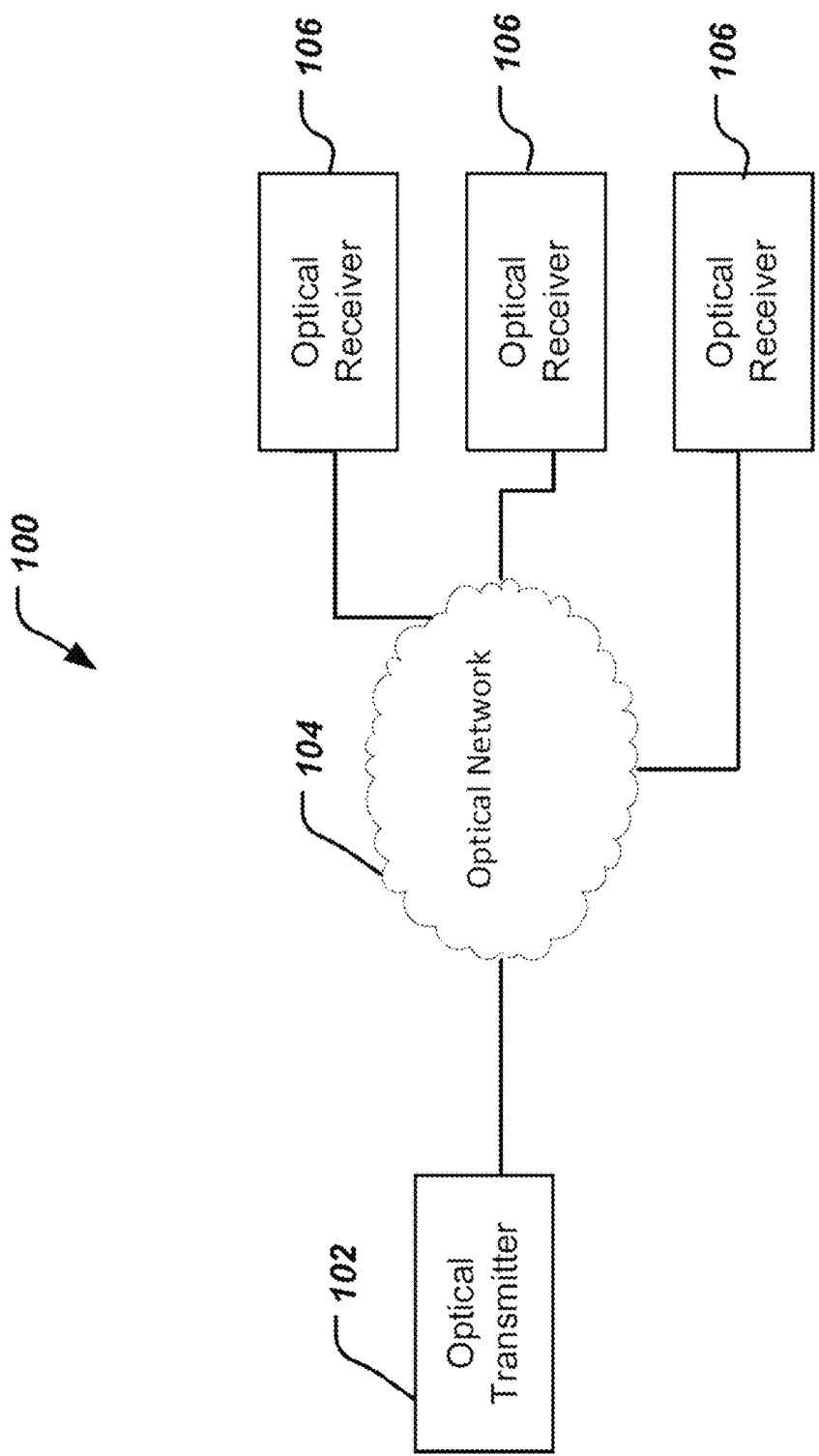
FIG. 1 shows an example optical communication system.

FIG. 1 depicts an optical communication system 100 in which the presently disclosed technology can be embodied. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity. Various techniques disclosed in this document can be implemented by apparatus 102, 106 in the transmission network 100.

Discussion

When communicating data between two devices coupled over a network connection, at the transmitted side, signals are generated based on the information bits to be transmitted, and at the receiver side, information bits are recovered from signals received via the network connection. During the process of signal generation and reception, the electrical or optical n waveforms that carry the information bits are processed through electrical or optical components, e.g., amplifiers, modulators, switches, multiplexers, transmitters, etc., which may exhibit non-linearity or other non-ideal behavior causing the actual signal in an apparatus to be different from an ideal mathematical representation of the signal.

Pattern-dependent symbol distortion is one example of such distortion caused by device nonlinearity at both transmitters and receivers. This type of distortion is caused by the influence of neighboring signal values on signal value at a given time instant. The distortion may occur, e.g., due to non-ideal time and/or frequency domain behavior of circuits and components used for signal processing.

Modern digital communication systems often use modulation schemes in which transmitted symbols represent multiple information bits. For example, Quadrature Amplitude Modulation technique with 4 to 10 bits per symbol (16 QAM to 512 QAM) may be used in some embodiments. Because adjacent symbols in general may have different values, the distortion causes due to neighboring symbol may depend on bit pattern of the data being carried by the symbols. The pattern-dependent symbol distortion is one of the practical limits for high-order QAM system implementations.

In some embodiments, a technique called digital pre-distortion (DPD), may be used to compensate nonlinearity at the transmitter. The technique may include estimating the end-to-end system's nonlinearity based on training sequences, and then offsetting that amount of nonlinearity at the transmitters. For example, a known training signal may be transmitted from the transmitter and received at the receiver and measurements may be performed at the receiver to determine the non-linear distortions suffered by the known training signal.

The nonlinearity can be characterized in form of lookup tables (LUT) that record the averaged symbol distortion as a function of a set of unique pattern indexes. The length and amount of the unique patterns may be governed by the memory sizes and the modulation levels, respectively.

Alternatively, or additionally, in some embodiments, the nonlinearity may be treated as a "black box" between the transmitter and the receiver in the system's diagram, and may be modeled by approximating as a transfer function in form of a memory polynomial.

In some embodiments, a post-compensation may be used at the receiver-side to compensate for the non-linearity distortions. The post-compensation may be used instead of, or along with, the LUT or memory polynomial approaches, and thus can be used standalone or together with the pre-compensation to achieve a better end-to-end performance.

Through experimentation, the inventors have realized that the training-based nonlinearity estimation may not be 100% accurate especially in low signal-to-noise (SNR) conditions, and such deviation usually leads to a sub-optimal performance.

This document provides, among other things, techniques for iterative nonlinearity post-compensation that, among other benefits, provide for ways by which to optimize the system performance with a given nonlinearity estimation.

Figure 2:
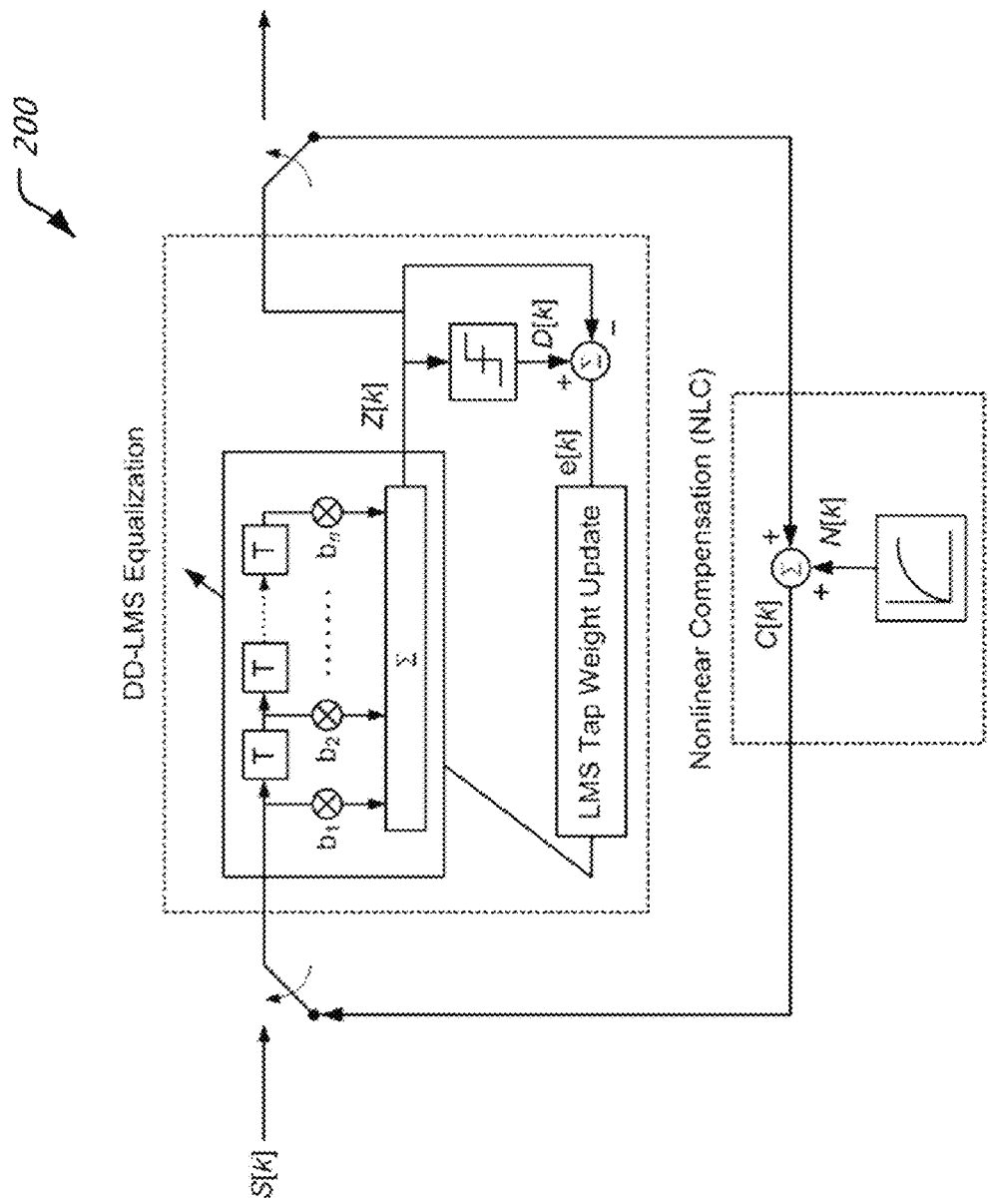
FIG. 2 shows a block diagram of an example of a non-linear compensation scheme.

FIG. 2 is a block diagram showing an example of an embodiment of a recursive nonlinearity compensation technique 200. In FIG. 2, the following abbreviations are used to represent various architectural blocks and signals:

$S[k]$: input symbols
$Z[k]$: output symbols
$D[k]$: symbols after hard-decision
$e[k]$: symbol errors $b_1$ to $b_n$: Tap coefficients of an adaptive filter N[k]: Pre-distortion amount for each incoming symbols C[k]: Pre-distorted symbols In addition, two functional blocks, or modules, are shown. A decision-directed least-mean-square (DD-LMS) equalization module, and a nonlinearity compensation (NLC) module. While a DD-LMS module is shown for the sake of explanation, in general, the module may use any error minimization technique, e.g., LMS or $L_1$ or $L_\infty$ error minimization criterion. The DD-LMS module, e.g., may minimize error vector between estimates of symbols and ideal symbols (e.g., known training symbols) based on minimum mean square error of the differences between the symbols.

The recursive process may start by feeding the input symbols S[k] into the DD-LMS equalizer, and then the output symbols Z[k] may be pre-distorted by the NLC block before being fed into the DD-LMS block again. The whole iterative process would be continued until the bit/symbol errors of Z[k] reach a threshold or the marginal improvement from one iteration to the next falls below a threshold.

In some embodiments, the DD-LMS block: may be a typical DD-LMS equalizer that contains an adaptive finite impulse response (FIR) filter with tap coefficients updated by the LMS algorithm.

In some embodiments, the NLC block may be implemented using a LUT approach. The LUT may be established by comparing the transmitting ideal symbols and the received symbols Z[k] after the DD-LMS equalization.

Figure 3:
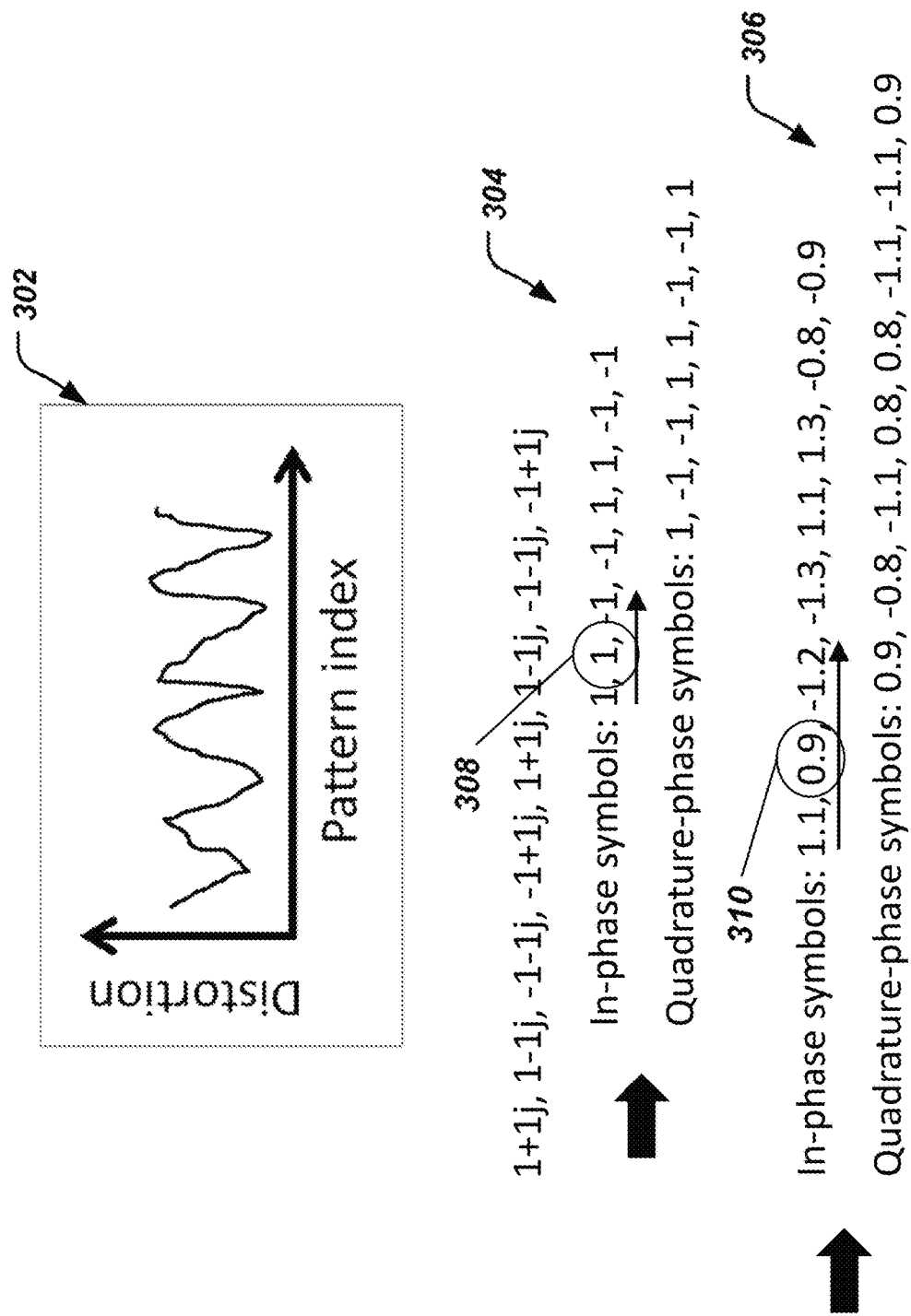
FIG. 3 shows examples of symbol patterns and a graph of observed distortion as a function of symbol pattern.

FIG. 3 provides some examples a process of constructing an LUT. In FIG. 3, an example is provided using Quadrature Phase Shift Keying (QPSK) modulation and using a symbol pattern of three consecutive symbol values for generating the LUT. In general, such LUTs may be constructed for any number of symbol patterns and symbols (e.g., various QAM or QPSK constellations). The graph 302 shows a plot of measured distortions along the vertical axis as a function of a pattern index along the horizontal axis. The number of data points along which the distortion curve can be plotted corresponds to the total possible number of symbol combinations in the pattern.

For example, a QPSK signal with memory size of three symbols has 8 unique pattern indexes: [1 1 1], [1 1 −1], [1 −1 1], [1 −1 −1], [−1 1 1], [−1 1 −1], [−1 −1 1], [−1 −1 −1], which would therefore be the data points along the horizontal axis in graph 302.

The listing 304 shows examples of reference symbol patterns used in generating a LUT for a QPSK signal. The reference symbols used as transmitting symbols may be: 1+1j, 1−1j, −1−1j, −1+1j, 1+1j, 1−1j, −1−1j, −1+1j.

The corresponding in-phase and quadrature symbols are listed in FIG. 3.

The listing 306 shows an example listing of received symbols after DD-LMS equalization: 1.1+0.9j, 0.9−0.8j, −1.2−1.1j, −1.3+0.8j, 1.1+0.8j, 1.3−1.1j, −0.8−1.1j, −0.9+0.9j.

The corresponding in-phase and quadrature values are shown in the listing 306.

As a specific example, value of the symbol at the position 308 is "1." The corresponding value, shown at position 310, is "0.9." The measured distortion for this central symbol is thus 0.9−1=−0.1, or about 10% (as plotted in graph 302).

Figure 4:
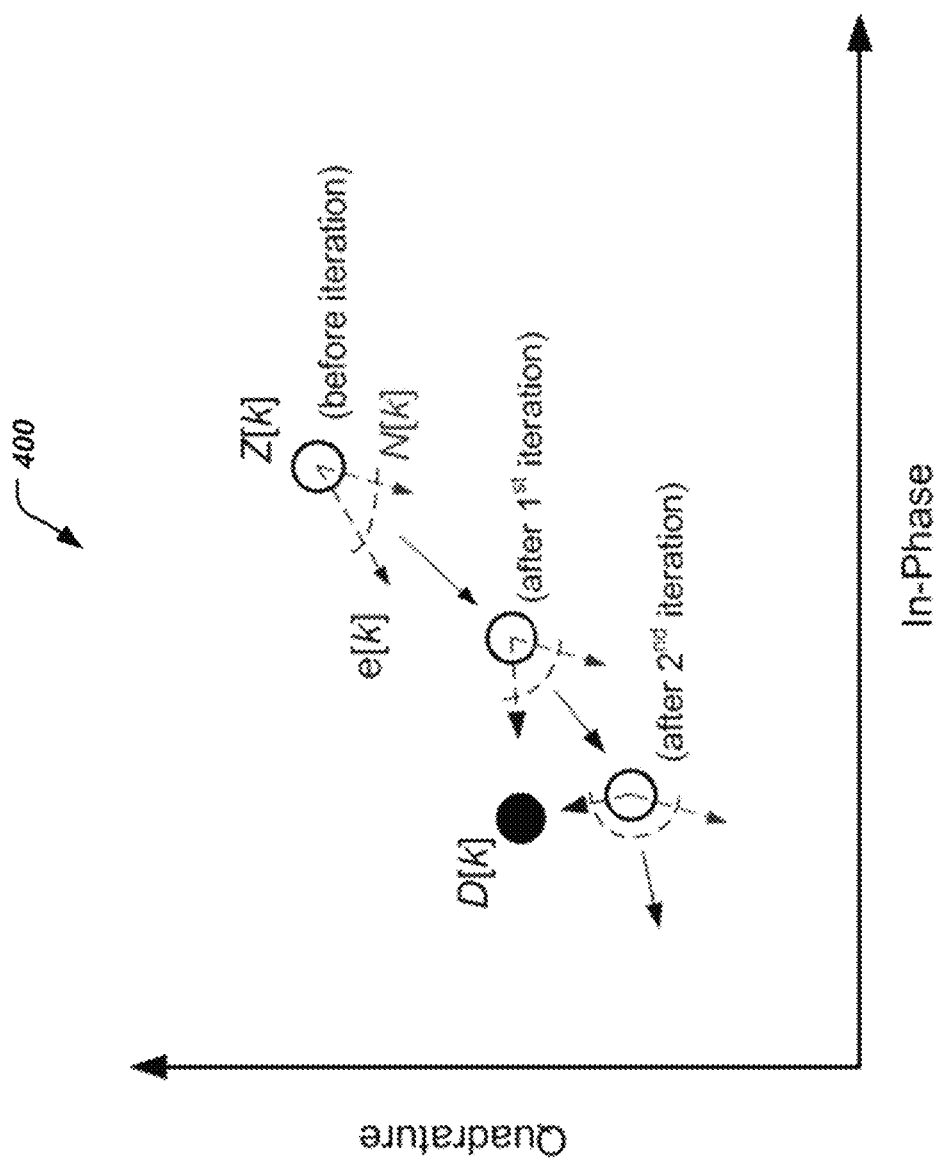
FIG. 4 is an example graph illustrating a method of optimization.

FIG. 4 shows a graphical example of the iterative optimization process 400. Before the iteration process, the output symbols Z[k] after the DD-LMS equalization have symbol errors e[k] pointed to the desired symbols D[k] in the I-Q plane. These errors are corrected using LUT in the direction of the pre-distortion amount N[k]. Ideally, like e[k], N[k] should also point to the desired symbols D[k]. However, in practice, there exists an angle between e[k] and N[k] since the nonlinearity estimation may not be fully accurate especially in low SNR condition. The use of an iterative process, as described herein, allows the filter coefficients in the DD-LMS equalization to be updated again and again using pre-distorted incoming symbols until e[k] is minimized, thus leading to convergence to the desired symbols.

Example Polarization Multiplexing Embodiments

Figure 5:
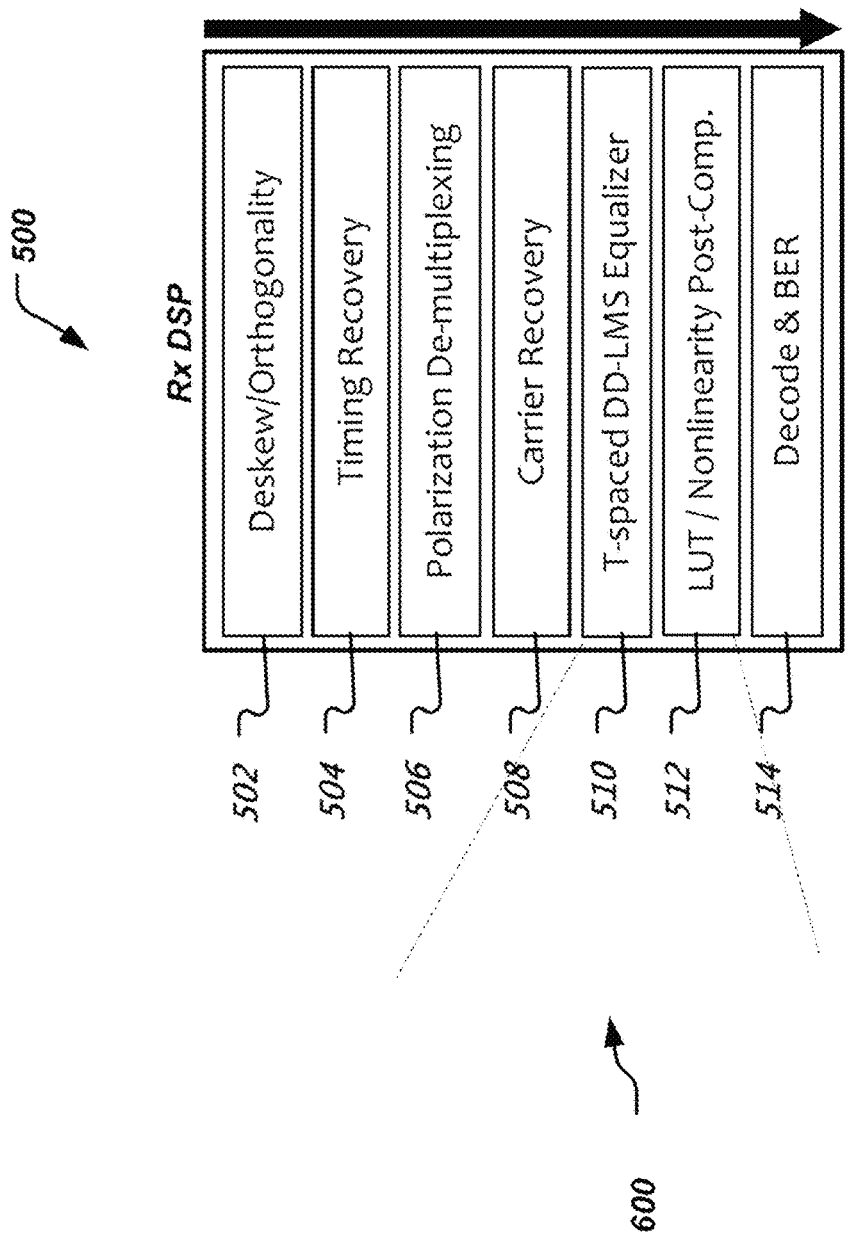
FIG. 5 lists examples of functions performed at the receiver side.
Figure 6:
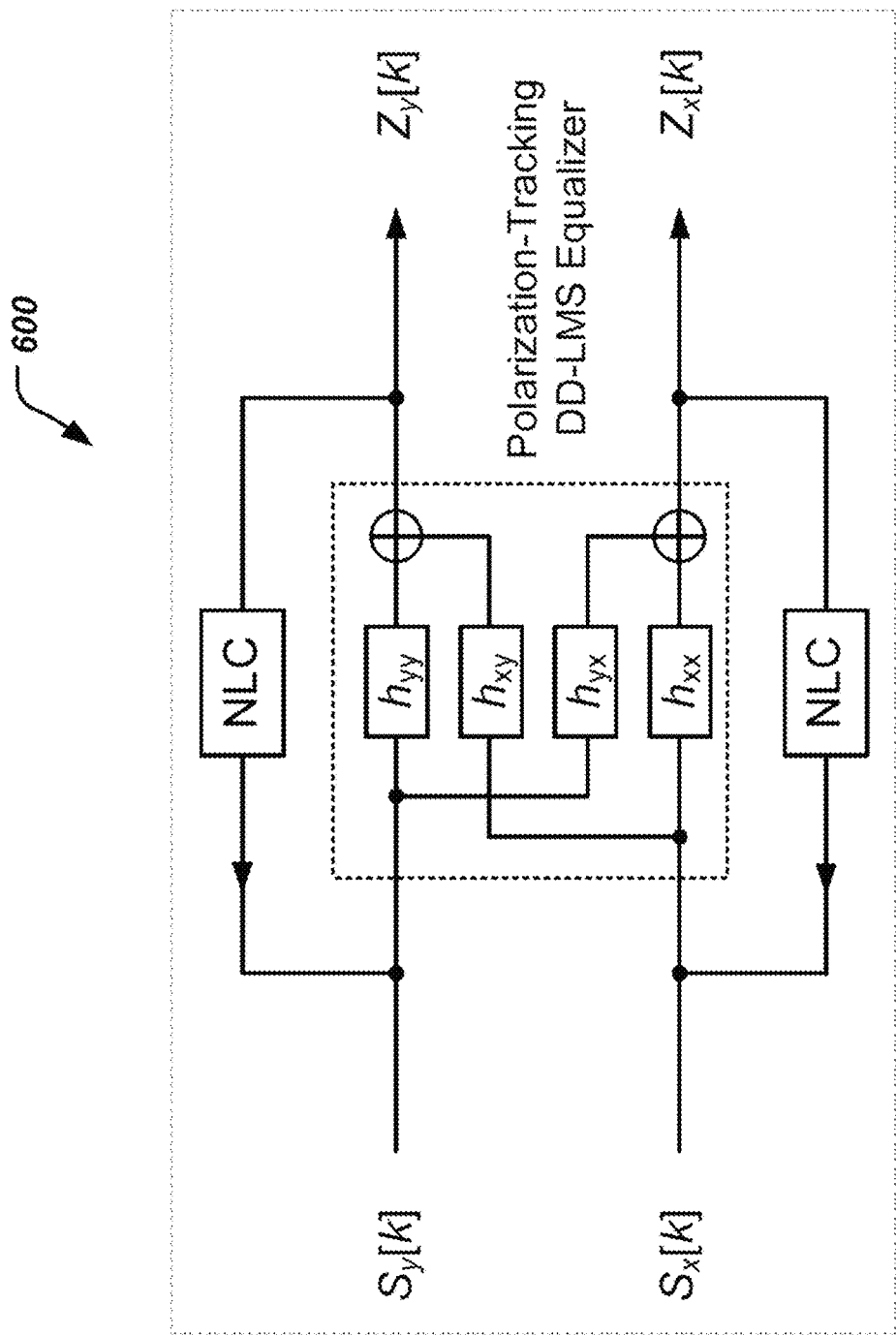
FIG. 6 shows an example of a polarization tracking decision directed least mean square equalizer.

With respect to FIG. 5 and FIG. 6, example embodiments in which receiver-side processing is performed using a DSP 500 for implementing several receiver tasks is disclosed. In various embodiments, these tasks may be implemented in sequence or parallelized when possible. The operations include deskewing 502, timing recovery 504, polarization de-multiplexing 506, carrier recovery 508, channel estimation using an equalizer, e.g., DD-LMS equalizer 510, post compensation using LUTs 512, and decoding the post-compensated symbols 514 and calculation of bit error rate (BER) for simulation and experimentation. The operations 510 and 512 may further include processing 600 described in FIG. 6.

FIG. 6 shows additional details of an example of iterative nonlinearity post-compensation method can be used in a polarization-multiplexing (PM) system.

In the depicted embodiments, the iterative process of T-spaced DD-LMS equalization and NLC starts after the carrier recovery. The T-spaced DD-LMS equalizer may include four adaptive FIR filters to further match the responses of x-polarization and y-polarization channels, as depicted in FIG. 6. The filters $h_{xy}$ and $h_{yx}$ represent cross-talk between the polarization components, modeled as linear filters, while the filters $h_{xx}$ and $h_{yy}$ represent the equalizer estimation for each component of x and y polarization $S_x$ and $S_y$ to determine the corresponding hard decision values $Z_x$ and $Z_y$.

Figure 7:
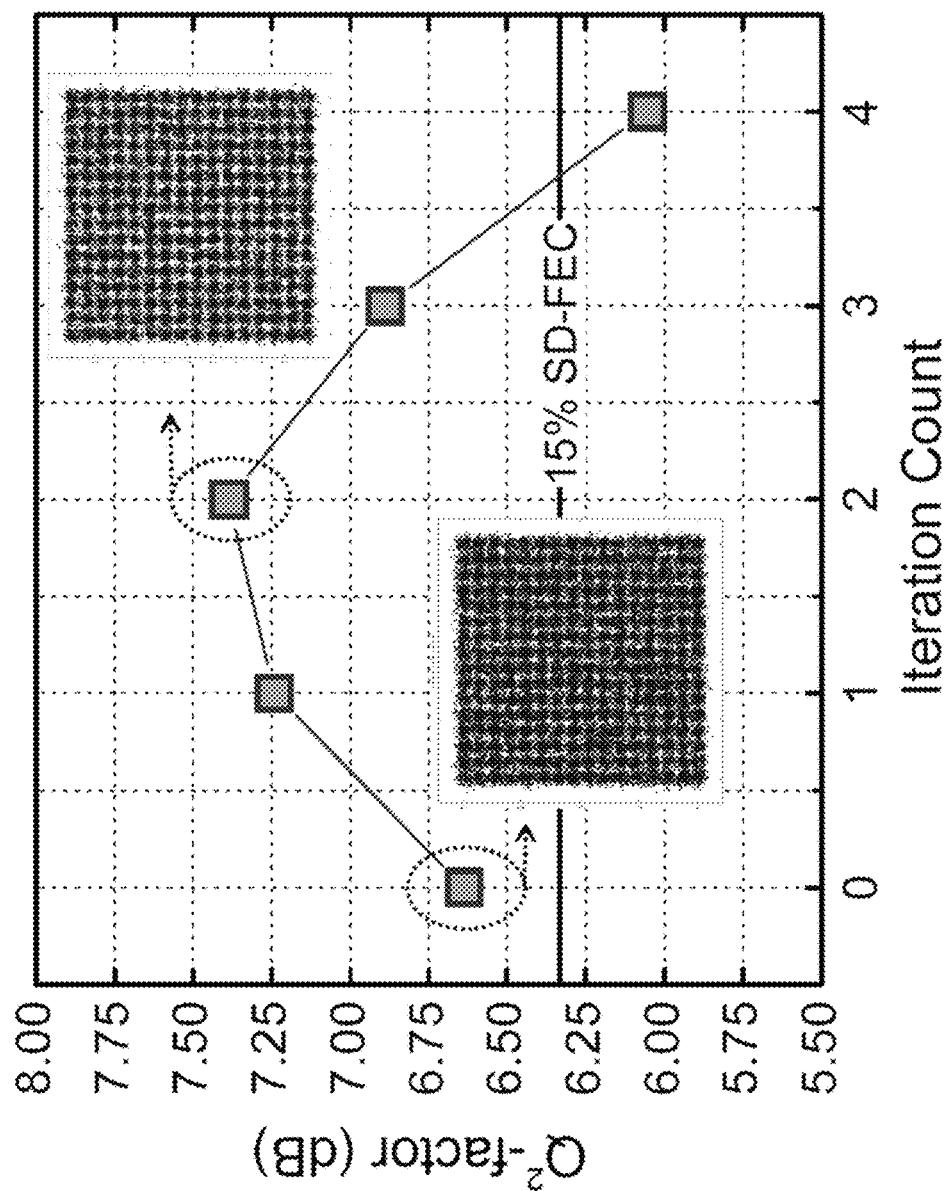
FIG. 7 shows an example graph of simulation results.

FIG. 7 shows a graph of an example experimental result obtained by the inventors. A 15% overhead soft decision forward error correction (SD FEC) scheme was used in the experiment. The LUTs were based on symbol patterns of 7 consecutive symbols. The vertical axis shows $Q^2$ factor improvement as a function of number of iterations performed. For iteration 0 and iteration 2, the corresponding symbol constellation is also depicted.

Figure 8:
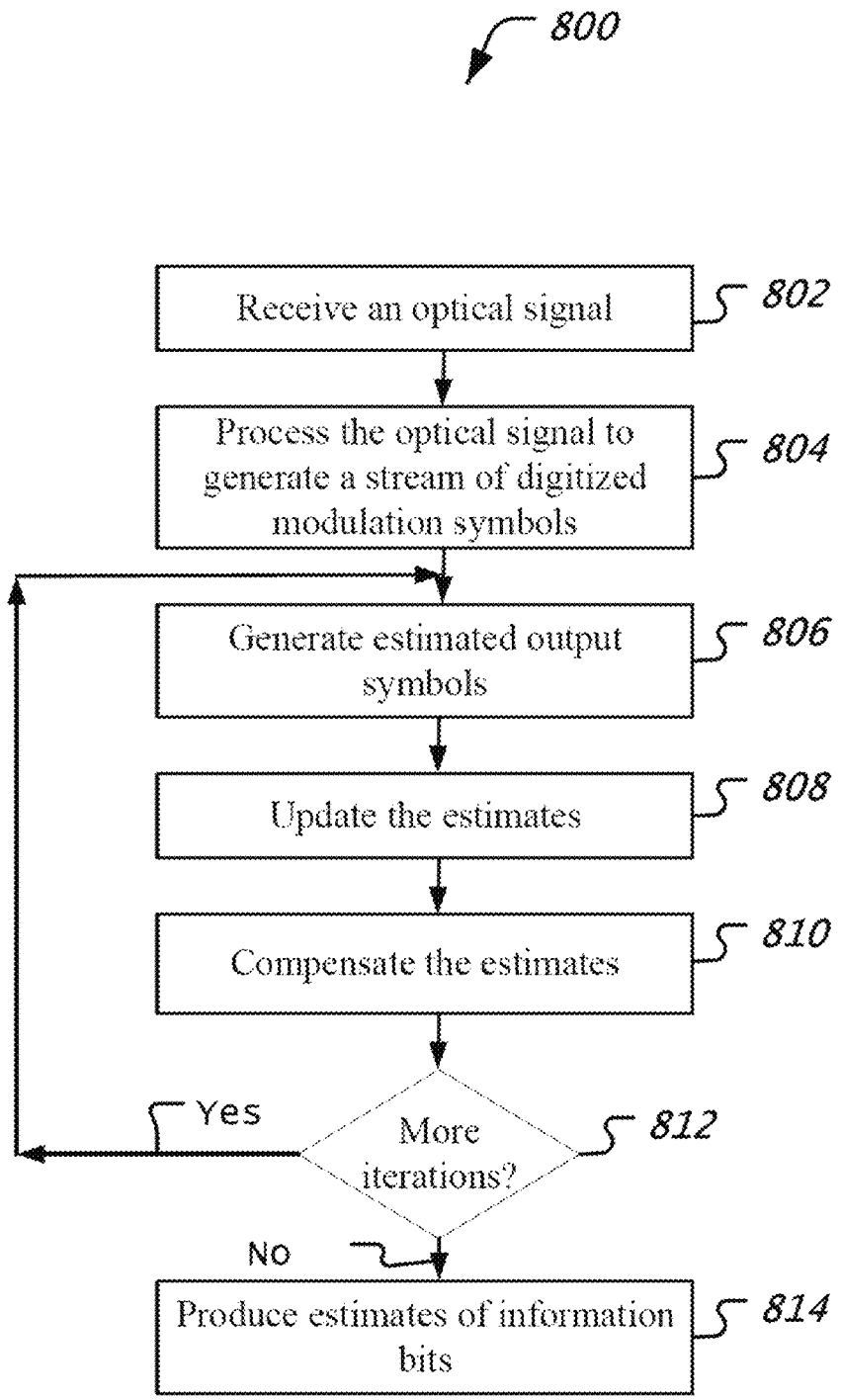
FIG. 8 is a flowchart representation of an example method of optical communication.

FIG. 8 shows a flowchart of an example of a method 800 of optical communication, implemented at a receiver. The method may be implemented, e.g., at the receiver circuitry in the apparatus 102, 106. As described in the present document, in some embodiments, the method 800 may be implemented by coordination between a transmitter and a receiver, e.g., by sharing a priori knowledge of training sequence which may include a known stream of symbols.

The method 800 includes, at 802, receiving, over an optical channel, an optical signal carrying modulated information bits. A photodiode such as a PIN diode or an avalanche dioe=de may be used in some embodiments.

The method 800 includes, at 804, processing the optical signal through a receiver subsystem to generate a stream of digitized modulation symbols from the optical signal. The processing may include optical filtering, processing through a low noise amplifier, etc.

The method 800 includes, at 814, producing, using the digitized modulation symbols as input symbols to an iterative process, estimates of information bits.

The iterative process of the method 800 includes, in each iteration, at 806, generating estimated output symbols from input symbols by filtering by an estimate of inverse of the optical channel.

The iterative process of the method 800 also includes, a 808, updating, using the estimated output symbols, the estimate of the inverse of the optical channel to minimize a measure of error. In some embodiments, the measure of error may be a least mean square error measure. In some embodiments, a DD-LMS algorithm may be used to update coefficients of channel filter estimate.

The iterative process of the method 800 includes, at 810, compensating the estimated output symbols by using pre-distortion values from a look-up table (LUT) to generate compensated output symbols that are used as input to a next iteration. To use the pre-distortion values, the method 800 may access an entry in the LUT based on the pattern of the output symbols. In general, compensation of the estimated output symbols may be performed by modifying a value using the entry in the LUT. In some embodiments, the symbol estimate may be replaced with a corresponding value in the LUT. In some embodiments, the estimated output symbols may be scaled, or multiplied, with the value in the LUT. In some embodiments, the value in the LUT may represent a correction that is added to the estimated output symbols.

The LUT may be organized in a hierarchical manner to provide fast access, where the tier of hierarchy may correspond to symbol values. For example, when a three-symbol pattern is used, then a first tier may be the symbol value of the central symbol, then a second tier may be for the symbol value of the preceding symbol and the third tier may be based on the symbol value of the subsequent symbol. In some embodiments, the symbol pattern may include an even number of symbols. Alternatively, an odd number of symbols may make up the symbol pattern. Since nonlinearities often occur with predominant odd harmonics, it may be beneficial to use odd number of symbol patterns.

At 812, a determination is made about whether to implement another iteration. The determination may be based on relative improvement in error minimization from the previous iteration, e.g., whether the increased improvement is above a threshold (continue iteration) or below the threshold (stop iteration). In various embodiments, different iteration termination criteria may be used, e.g., elapse of a time interval, number of iterations reaching a maximum threshold, etc. As explained in the present document the method 800 may be used to effectively compensate for non-linear degradation in the system due to non-linearity of components and channel distortion.

In some embodiments, the method 800 may include receiving optical signal that includes two or more components that are multiplexed using polarization division multiplexing, e.g., horizontal and vertical polarization. The method 800 may then include a polarization demultiplexing operation to recover individual components prior to the generation of symbol streams. The method 800 may also include storing a different set of entries of the LUT for each polarization domain component, wherein the set of entries for a given polarization component takes into account contribution of symbol patter configuration from another polarization domain component. In some embodiments, the same symbol run length may be used for each polarization division symbol run based on which LUT entries are organized. For example, for each distinct run of N symbols in the first polarization domain, LUT entries that list the corresponding distortion compensation may be listed for every possible run of M symbols in the second polarization domain (N and M integers). For efficiency of look-up and compactness of LUTs, the number M may be chosen to be smaller than N, e.g., N may be 3 and M may be 1.

The LUT, or LUTs in case of polarization, may be generated a priori, as described in the present document. In some embodiments, the LUT may be updated from time to time by monitoring significant changes to the operational setup, e.g., the transmitter or the receiver may be being implemented by changing a component that results in a change in the non-linearity of the back-to-back system.

Figure 9:
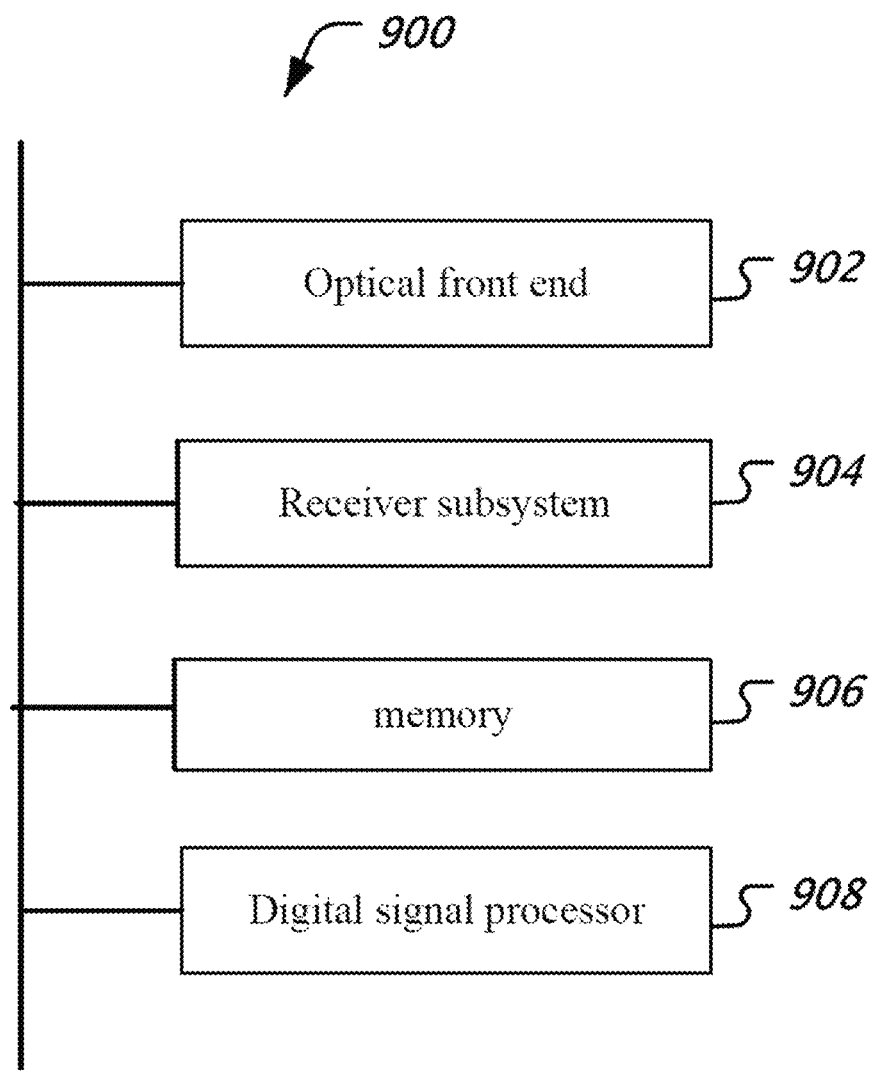
FIG. 9 shows a block diagram representation of an optical receiver apparatus.

FIG. 9 shows an example of a receiver apparatus 900. The apparatus 900 includes an optical front end 902, a receiver subsystem 904, a memory 906 and a digital signal processor 908. The optical front end 902 receives an optical signal carrying modulated optical signal from an optical channel. The optical front end 902 may include, e.g., a photo-detector such as a photo-diode that receives light signals and generates electrical signals that are filtered and amplified by an electrical amplifier.

The receiver subsystem 904 processes the optical signal and generates a stream of digitized modulation symbols from the optical signal. The receiver subsystem 904 may be implemented in a combined software-hardware implementation in the electrical domain, and may perform tasks that include de-skewing the received signal, restoring orthogonality of the received signal, timing recovery, polarization de-multiplexing, carrier recovery, etc. (e.g., FIG. 5). In some embodiments, these tasks may be performed in software that is executed on a receiver DSP. In some embodiments, semiconductor circuits such as phase lock loops may be used for carrier and timing recovery.

The memory 906 stores instructions, which when implemented by the digital signal processor 908, cause the digital signal processor to generate estimated output symbols from input symbols by filtering by an estimate of inverse of the optical channel, update, using the estimated output symbols, the estimate of the inverse of the optical channel to minimize a measure of error, and compensate the estimated output symbols by using pre-distortion values from a look-up table (LUT) to generate compensated output symbols that are used as input to a next iteration. The receiver apparatus 900 may further implement the features discussed with respect to method 800.

Figure 10:
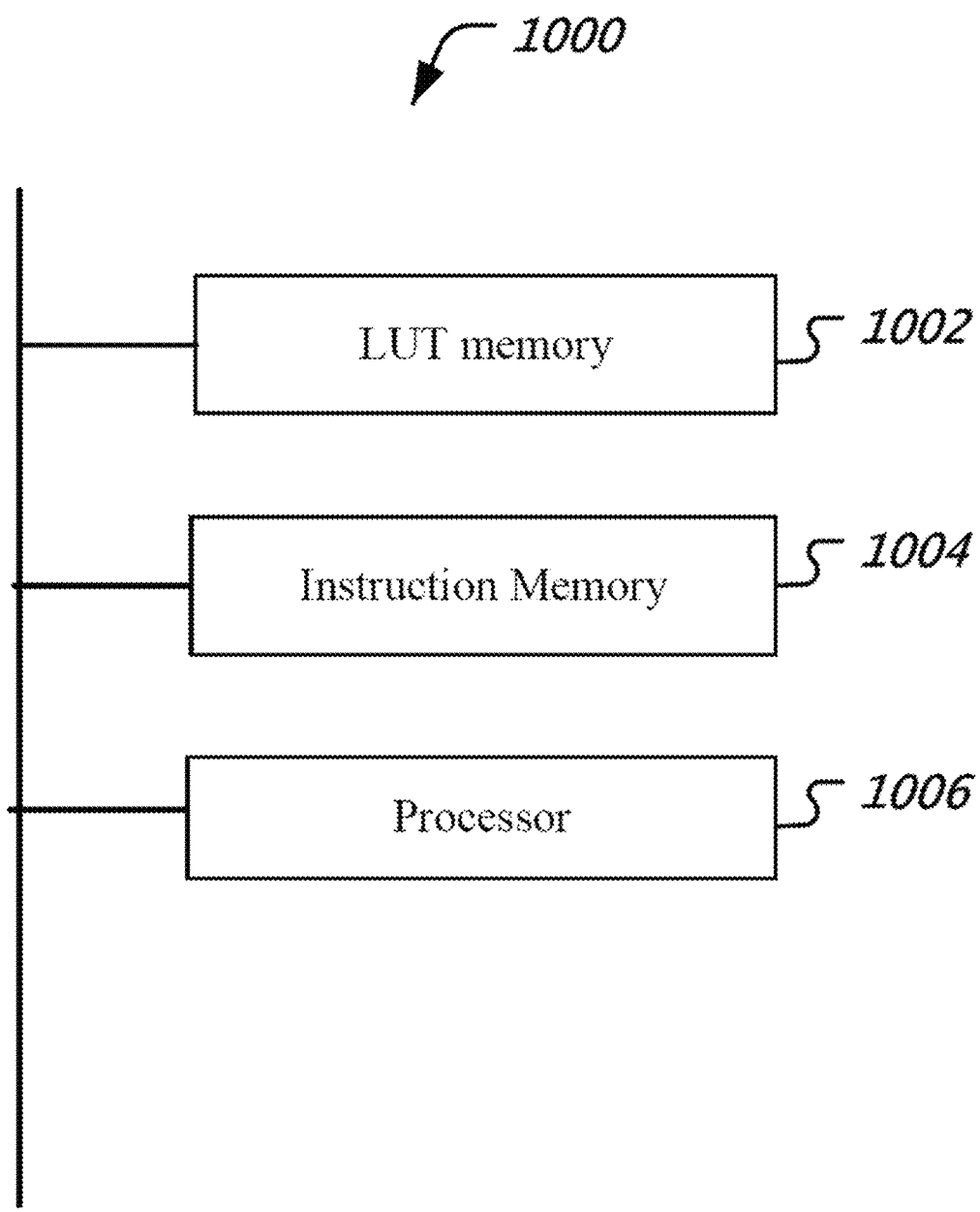
FIG. 10 shows a block diagram representation of another optical receiver apparatus.

FIG. 10 is a block diagram of an example of an optical communication receiver 1000, which includes a first memory 1002 in which look up table (LUT) values sorted according to symbol patterns, wherein each LUT value corresponds to an amount of additive correction, are stored. The apparatus 1000 includes a second memory 1004 in which instructions are stored. The apparatus 1000 includes a processor 1006 that reads the instructions from the second memory and implements a data reception method. The instructions include instructions for operating an optical front end to receive, over an optical channel, an optical signal carrying modulated information bits, instructions for operating a receiver subsystem to process the optical signal to generate a stream of digitized modulation symbols from the optical signal, instructions for generating estimated output symbols from input symbols by filtering by an estimate of inverse of the optical channel, instructions for updating, using the estimated output symbols, the estimate of the inverse of the optical channel to minimize a measure of error, and instructions for compensating the estimated output symbols by the amount of additive correction. The receiver apparatus 1000 may further implement the features discussed with respect to method 900.

It will be appreciated that techniques for estimating and mitigating non-linearity in a communication network due to limitations in devices used in the transmitter and/or receiver are disclosed. In some embodiments, symbol pattern dependent look-up tables are used to iteratively compensate for distortions in estimates of received symbols. The LUTs may themselves be generated using iterative techniques.

Exemplary Embodiments of a Single-Carrier 400G Coherent Optical Interface

Single-carrier 400G (SC-400G) has been considered an attractive coherent optical interfaces for next-generation line-side transmission. Emerging SC-400G modulation formats ranging from 4 to 10 bits per symbols for different targeting long-haul distances have been demonstrated. On the other hand, recently coherent optical interfaces for client-side applications have gained lots of interest due to their superior bandwidth efficiency compared to those based on typical IMDD parallel optics at a given channel capacity. In addition, recent advent of miniaturized and cost-effective coherent optical transceivers enabled by silicon photonics has made this concept even more compelling. To further improve the bandwidth efficiency, a SC-400G coherent optical interface based on PM-256QAM can be implemented with the disclosed techniques. 480-Gb/s PM-256QAM signal generation was successfully achieved by using a fast-converging polarization-tracking blind equalization in cooperation with nonlinearity pre- and post-compensation algorithms, which ultimately reaches 7.38 dBQ in back-to-back connection, leaving 1.04-dBQ margin to the soft-decision (SD) pre-FEC limit.

SC-400G Coherent Interfaces Using PM-256QAM

Figure 11:
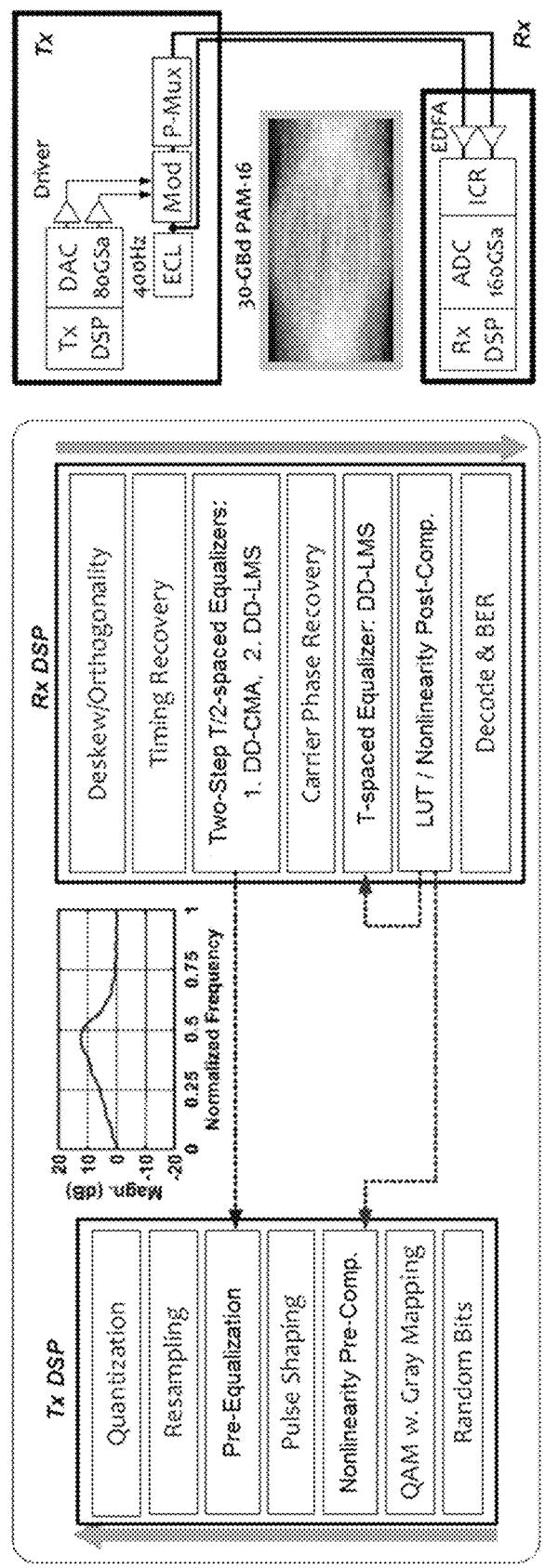
FIG. 11 shows an exemplary setup for a PM-256QAM SC-400G generation, and key enabling Tx and Rx DSP algorithms.

FIG. 11 shows an exemplary back-to-back (BTB) experimental setup for the proposed SC-400G coherent optical interfaces using PM-256QAM. The transmitter Tx (1101) includes an external cavity laser (ECL) with a narrow linewidth of 400 Hz at 1550.3 nm, a 26-GHz optical I/Q modulator, two 30-GHz drivers with 6-dB input attenuation, a 80-GSa/s digital-to-analog converter (DAC) with analog bandwidth of around 20 GHz, and a polarization multiplexer (P-Mux) for PM emulation. The receiver Rx (1103) consists of two EDFA pre-amplifiers, an integrated coherent receiver (ICR) with 40-GHz balanced photo-detectors, and a 160-GSa/s analog-to-digital converter (ADC) with 19.28-GHz digital bandwidth. Self-coherent Rx structure was considered since a narrow-linewidth LO was not available, and it was replaced by sharing part of the ECL power using a polarization-maintaining optical coupler. In the Tx DSP (1105), Graymapped 256QAM symbols with a length of 24,576 is generated, and is then fed into a digital pre-distortion (DPD) block to pre-compensate the system's nonlinearity. After root-raised-cosine pulse shaping with a roll-off factor of 1, ×2 oversampling, and pre-equalization, the symbol sequence is re-sampled to match the DAC's nominal sampling frequency, and its real (I-path) and imaginary (Q-path) symbols are individually quantized in 8 bits before being loaded to the DAC. FIG. 11 also shows a measured eye diagram (1109) of the generated 30-GBd PAM-16 (I-path) at the DAC output. The Rx DSP (1107) includes front-end correction, squaring time recovery, a fast-converging polarization-tracking T/2-spaced equalizer, carrier phase recovery using blind phase search (BPS) algorithm with 64 divided phases, a T-spaced DD-LMS post equalizer, and lookup table (LUT) generation for TRx nonlinearity compensation.

Practical Limits: ENOB, Equalization and Nonlinearity

Figure 12B:
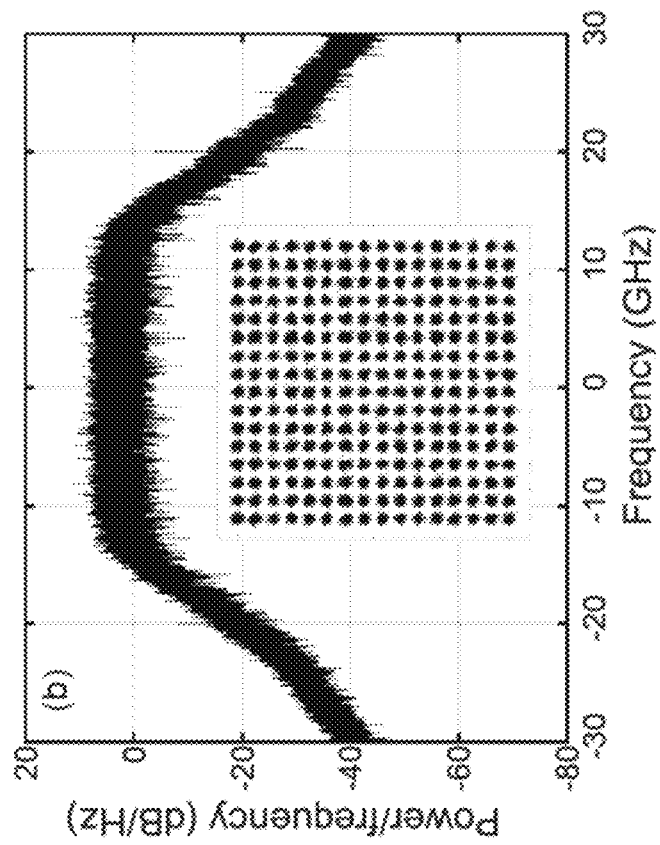
FIG. 12B shows an exemplary RF spectrum and the constellation diagram of the received 30-Gbd 256QAM signal in eBTB.
Figure 12A:
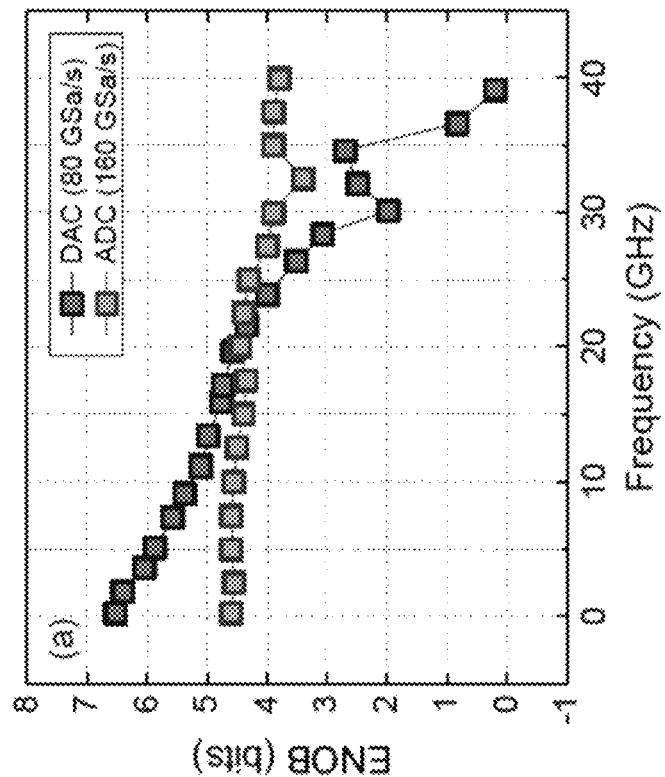
FIG. 12A shows exemplary measured ENOB performance of ADC/DAC.

Effective number of bits (ENOB) of DAC/ADC is the primary hardware limit for the proposed PM-256QAM SC-400G interface, and it is beneficial to learn the benchmark performance of electrical back-to-back (eBTB) link of DAC and ADC in the very beginning. FIG. 12A shows the measured ENOB for the 80-GSa/s DAC and 160-GSa/s ADC used in the test bed. The DAC has more than 5 bits over 13 GHz and can reach 6 bits and above within 5 GHz, while the ADC has a flat, but a bit lower ENOB of about 4.7 bits over 20 GHz. FIG. 12B shows the received RF spectrum and constellation diagram of a 30-GBd 256QAM signal in electrical BTB. The best achievable Q2-factor is 11.5 dBQ using enhanced Tx and Rx DSP.

It is known that very-high-density QAM systems are subject to slow convergence when using multi-modulus blind equalization and are also highly sensitive to devices' nonlinearity, both of which are the other two practical limits to be conquered in this PM-256QAM SC-400G configuration. First of all, a fast-converging polarization-blind equalizer for very-high-order QAM optical systems is leveraged, in which the T/2-spaced FIR tap coefficients in a MIMO structure are updated in two steps as illustrated in FIGS. 13A-13H. The error function of the first tracking DD-CMA step is governed by both constant modulus algorithm (CMA) and decision-directed least mean square (DD-LMS) algorithm inside the same loop, enabling faster convergence speed and lower mean square error (MSE) than those with standalone CMA/MMA/DD-LMS algorithms, while the second step uses enhanced DDLMS to minimize the MSE. FIG. 13A and FIG. 13B display the x-pol constellation diagrams of the 30-GBd PM-256QAM signal with 35-dB ONSR after the 1st and 2nd steps of the T/2-spaced equalization. In addition, as illustrated in FIG. 11, an estimated inverse channel response for pre-equalization at the Tx can be derived from the abovementioned T/2-spaced equalization. A subsequent T-spaced post DD-LMS equalizer was used to precisely match the channel response within the Nyquist band providing valuable processing gain.

Figure 14B:
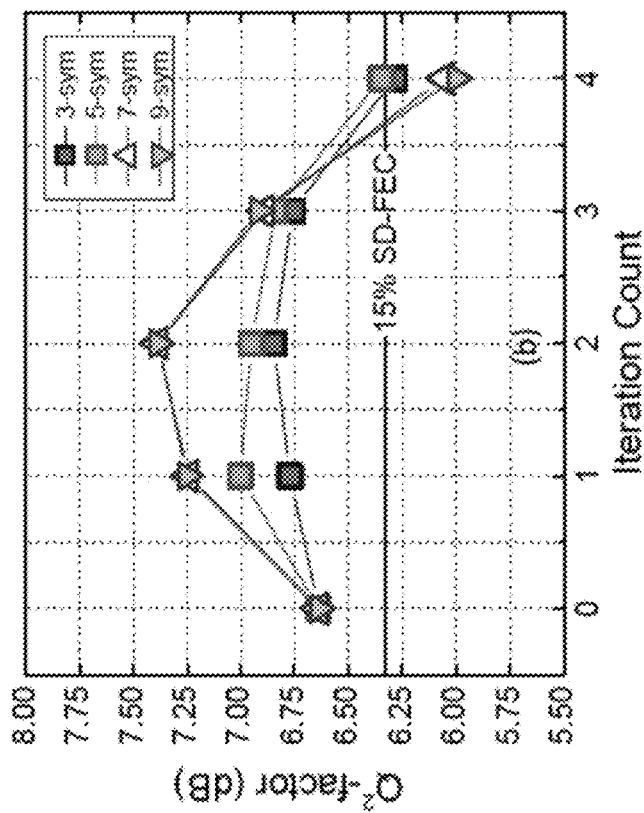
FIG. 14B shows exemplary BTB performance of 480-Gb/s PM-256QAM signals at 35-dB OSNR as a function of the iteration count in the feedback loop of T-spaced DD-LMS equalizer and nonlinear post-compensation.
Figure 14A:
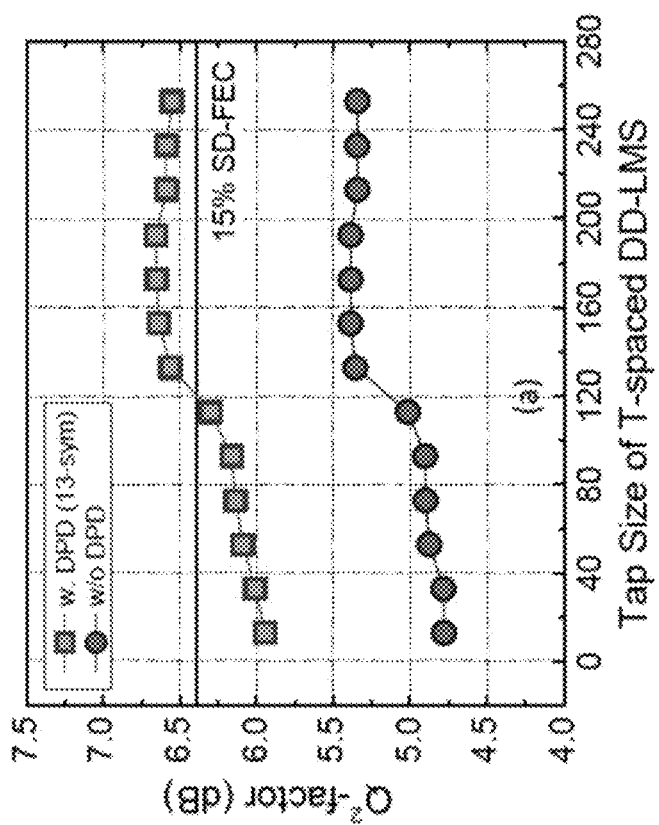
FIG. 14A shows exemplary BTB performance of 480-Gb/s PM-256QAM signals at 35-dB OSNR versus the tap size of the post equalizer with and without DPD.

To overcome the nonlinearity-induced pattern-dependent symbol distortion, LUTs with various memory lengths are established for the incoming I and Q symbols in each polarizations, respectively, and can be used for DPD at the Tx. FIG. 13E and FIG. 13F show the obtained x-pol LUTs with memory lengths of 3 and 13 symbols, respectively, which were trained by using 295 k symbols obtained at the output of the T-spaced post equalizer. The pattern dependency can be clearly observed in the 3-symbol case; however, distortion associated with higher-order nonlinearity can be better uncovered in the 13-symbol case. Note that, the pattern index sets were defined by searching the unique symbol patterns that actually present in the sending symbol sequence at the Tx DSP. FIG. 14A depicts the BTB performance of 480-Gb/s PM-256QAM signals versus the tap size of the T-spaced post equalizer with and without 13-symbol DPD. With the tap size ranging from 153 to 173, both cases can be optimized. Moreover, with 13-symbol DPD, 6.65-dBQ can be reached exceeding the 15% SD pre-FEC Q2-factor limit of 6.34 dBQ ($1.9 \times 10^2$), and 1.26-dBQ gain with DPD was observed. FIG. 13C shows the x-pol constellation diagram with 13-symbol DPD, and a 13-symbol LUT after the DPD confirms the nonlinearity suppression as represented in FIG. 13G. To further improve the Q2 margin, a feedback loop of the T-spaced DD-LMS post equalizer with subsequent nonlinearity post-compensation is proposed as illustrated in FIG. 11. FIG. 14B shows the measured Q2-factor versus the iteration count. 7-symbol LUT nonlinearity post-compensation with two times of iteration contributed a valuable processing gain of 0.73 dB, reaching 7.38 dBQ, and the output constellation is shown in FIG. 13D.

Therefore, the use of nonlinearity pre- and post-compensation together can provide 2-dBQ gain, which boosts system margin to 1.04 dBQ, and ultimately turns the extremely challenging PM-256QAM SC-400G interfaces into a reality.

Additional Information Regarding Training Assisted Joint Equalization

Two techniques, among many techniques used to increase available channel capacity to meet next-generation single-carrier optical coherent transmission systems, may be (1) to increase the signal baud rate and (2) use higher and higher levels modulation formats, or a combination of both these techniques may also be used. The use of higher modulation formats and greater baud rates in turn rely on availability of high optical signal to noise ratio channels and highly linear components for implementation, without which, any gains in increased baud rates and modulation formats could be negated, at least partially, due to noise and non-linear signal distortions.

Such high-bandwidth systems may attempt to configure major opto-electronic devices in the transmission or reception path to operate beyond their specified bandwidth or linearity region of operation.

For example, pattern-dependent symbol distortion caused by devices' nonlinearity at both transmitter-side and receiver-side is one of the practical limits for high-order QAM system implementation (e.g., 64 QAM or higher constellations). This kind of the nonlinearity can be characterized in form of lookup tables (LUT) that records the averaged symbol distortion for a set of unique symbol patterns. In various embodiments, the length and amount of the patterns can be selected to fit within available memory sizes and to take into account possible values for the modulation levels, respectively.

The LUT based nonlinearity compensation uses high-performance signal quality in order to accurately estimate pattern-dependent distortions after averaging amount of training sequence. Otherwise, the deviation in LUT will lead to sub-optimal even degraded performance.

Figure 15:
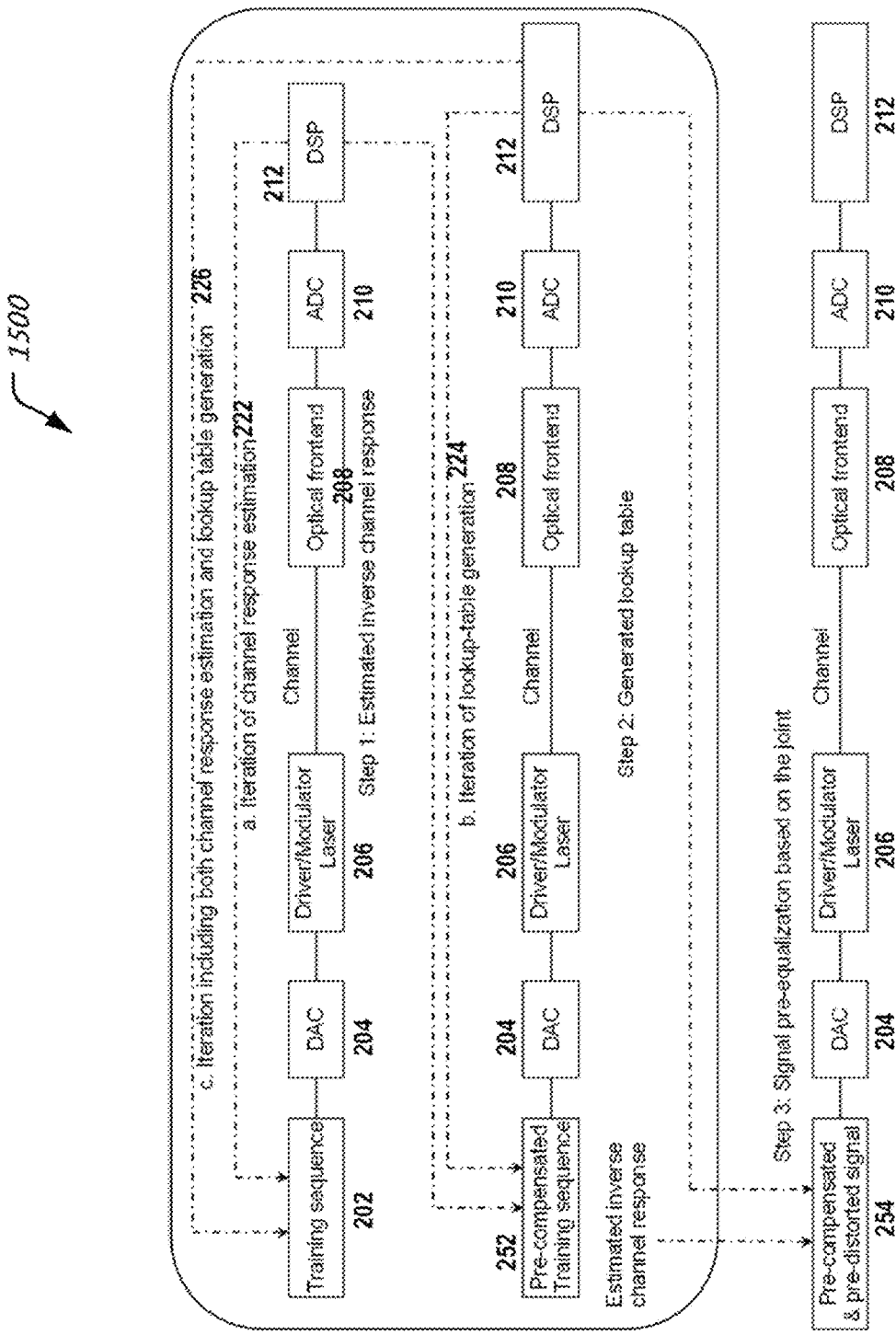
FIG. 15 is a block diagram example of a process of joint optimization.

FIG. 15 shows a block diagram of an example of a joint equalization process 1500. Considering the training sequence, which includes a number of known symbols or constellation points as the input of the whole process, the output would be the estimated channel inverse response for pre-compensation and lookup table for pre-distortion. Pre-equalization may be used to mitigate limitations in the amplitude response in the end-to-end system. For example, due to limitations in bandwidth of components and channel, a back-to-back combination of transmitter and receiver may exhibit amplitude loss at high frequencies. Pre-equalization may be performed to compensate for this increased attenuation at higher frequencies by boosting signal power at higher frequencies in a manner that mimics the inverse of the calculated drop in gain as a function of frequency. Pre-distortion may be used to compensate for non-linearity in components used to implement transmitter or receiver modules. Component non-linearity may or may not be related to frequency but may be related to other parameters such as instantaneous signal power, amplitude, phase, etc. For example, it may be possible to achieve perfect pre-equalization, but the resulting system may still exhibit degradation due to non-linearity and may thus also have to be jointly pre-distorted, e.g., by a joint equalization process as described herein.

The process 1500 may be implemented in three stages. In the first stage, channel between a transmitter and a receiver may be estimated, e.g., by estimating an inverse of channel response to compensate for the channel. In the second stage, a same or different training sequence may be passed through the same channel from the transmitter to the receiver, this time by pre-equalizing using the channel estimate and a pattern-dependent LUT may be generated.

The example embodiment depicted in FIG. 15 shows a module 202 that generates the training sequence symbols. A digital to analog conversion (DAC) module 204 may generate analog signals from the symbols generated by the module 202. The output of the DAC 204 may be used to drive a modulator, e.g., a laser modulator 206, to generate a modulated optical signal. The modulated optical signal may be transmitted over a channel to the receiver, where an optical front end 208 may receive a version of the modulated optical signal that has undergone changes due to the channel. The optical front end 208 may process the received signal, e.g., converting the optical signal to electrical domain, and produce an electrical signal input for the analog to digital conversion (ADC) module 210. The ADC module 210 produces digital symbols that are then processed through a digital signal processor (DSP) 212 for generation of LUT.

Example Embodiments of the First Stage

In order to obtain a reasonable signal quality for an effective LUT creation, in the first stage, embodiments may use the training sequence to estimate inverse channel response to perform pre-equalization process. It is either based on the transfer function of receiver-side adaptive equalizer in the DSP module or a zero-forcing method. As indicated by the dashed feedback line 222, the channel response estimation stage may be implemented by performing multiple iterations. In the first stage, or the pre-equalization stage, the receiver may communicate its estimate of the inverse of the channel response to the transmitter in a communication message. The estimate may be represented as a linear FIR or IIR filter. The transmitter may receive filter coefficient values, store in a local memory and may filter, or pre-equalize, subsequent training symbols using the estimate of the inverse of channel response for further use. This process may be iterated multiple times, as indicated by the dashed feedback line 226, to arrive at an accurate estimate of the inverse channel response.

Example Embodiments of the Second Stage

In the second stage, the training sequence being used in the second stage is pre-equalized using the inverse channel function estimate obtained in the first stage. The pre-equalized training sequence is then passed through the same channel and LUTs are generated based on the received signal. In some embodiments, the same training sequence may be used for the channel estimation and for training sequence pre-equalization of the generation of LUT. Alternatively, in some embodiments, different training sequences may be used for channel estimation and for LUT generation. In some embodiments, training sequences that include symbol patterns of all possible combinations of neighboring symbols may be used for LUT generation, while training sequences that have a relatively flat frequency response may be used for channel estimation. The length of training sequences may be selected based on available memory at the receiver and/or the transmitter to store the training sequences, intermediate results and LUTs. The pre-equalized training sequence is passed through the same channel to generate the pattern dependent LUT through comparing the transmitted signal with the corresponding recovered ones. As indicated by the dashed line 224, the stage of passing signal through the transmitter-receiver by pre-compensating the training sequence 252 for LUT generation may be iterated multiple times to improve the accuracy of the LUTs. In some embodiments, the number of iterations used may be based on determining whether the improvement achieved from one iteration to the next is still above a minimum threshold (e.g., least mean squares error improvement). In some embodiments, a fixed number of iterations may be performed, e.g., 2 to 10 iterations. Other possibilities include performing iterative optimization until a certain time period hasn't expired, or until number of computations are below a threshold, and so on.

Example Embodiments of the Third Stage

In the third stage, after the previous two stages, which may be iteratively performed independent of each other, a joint iteration process to further positively optimize the linear and nonlinear estimations of two aforementioned stages may be performed.

In this stage, embodiments may apply the obtained inverse channel response and LUT into the transmitted signal for the pre-compensation and pre-distortion 254. One advantageous use of the iterative channel response estimation is to accurately equalize the bandwidth limitation in perspective of channel amplitude response. Meanwhile, the pre-distortion process performs much accurate pattern alignment because of the significant improvement of bit error level in cascade with the pre-compensation process.

The third stage, or the joint equalization stage, may be performed iteratively until no additional benefits from iterations are seen.

Example Experimental Setups

Figure 16A:
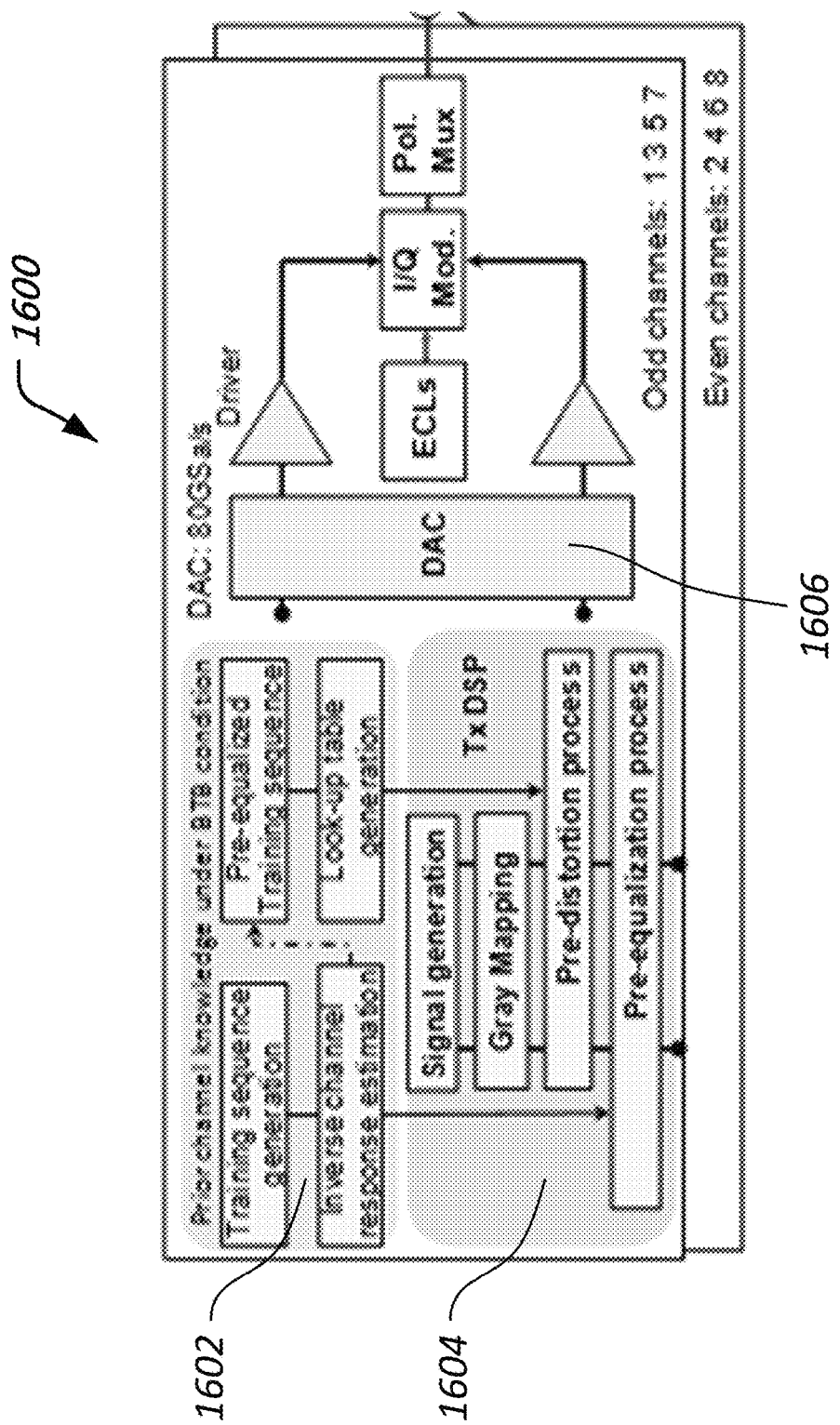
FIG. 16A shows an example of transmitter used in a polarization division multiplexing transmission system.
Figure 16B:
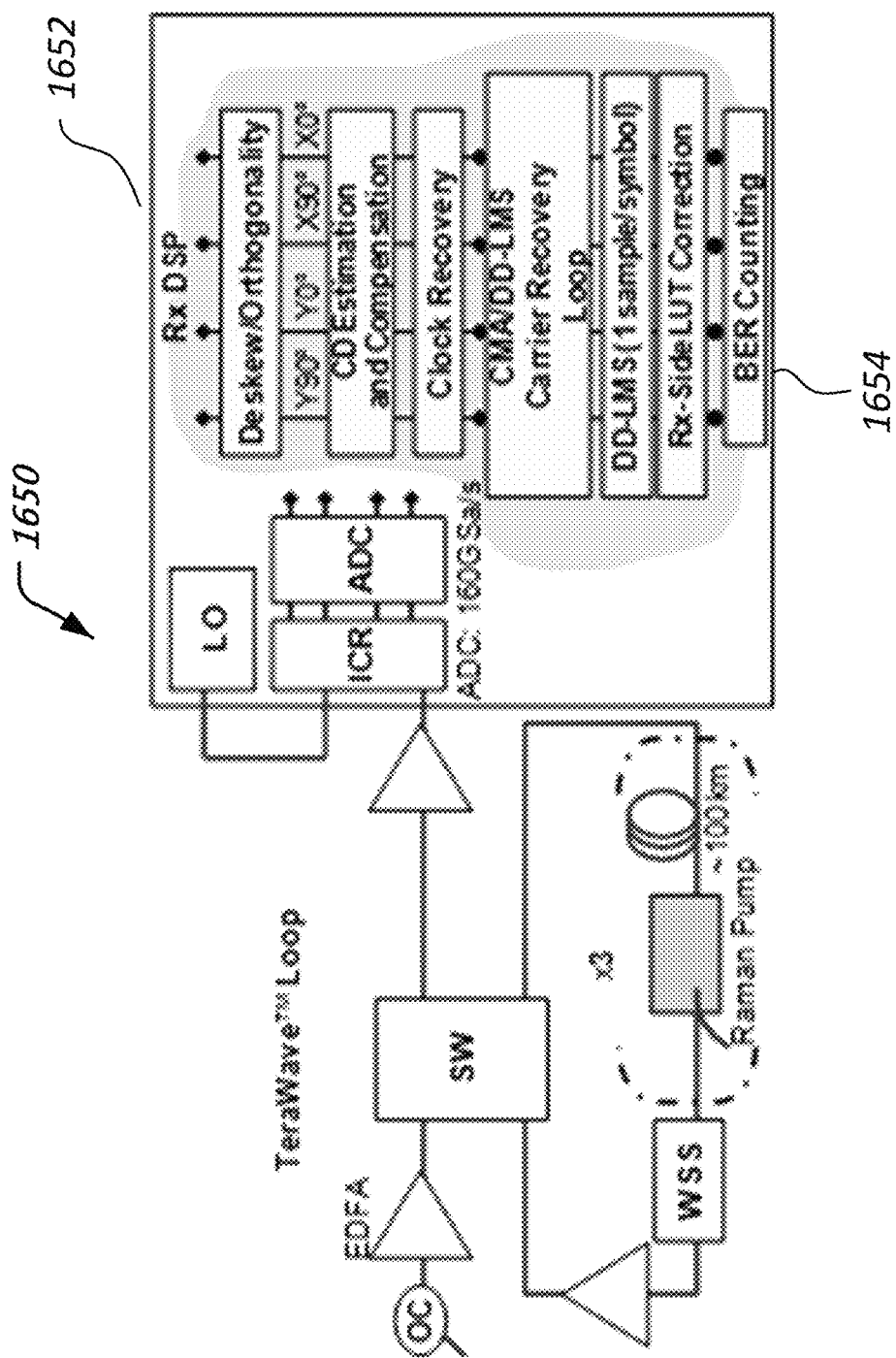
FIG. 16B shows an example of receiver used in a polarization division multiplexing transmission system.

As shown in the example block diagram of FIG. 16A and FIG. 16B, the training-assisted joint equalization approach can also be used in a polarization-division multiplexing (PDM) coherent optical transmission system with transmit side 1600 depicted in FIG. 16A, and the transmission channel and the receive side 1650 depicted in FIG. 16B. The system 1600 shows a single-carrier 400G solution based on 51.25-GBaud PDM-32QAM signal at 6.15-b/s/Hz SE over 1200-km transmission distance.

At the transmit side, even and odd optical channels are multiplexed together for transmission on the optical network. As indicated by the subsystem 1602, channel knowledge derived from back-to-back training, e.g., as described with respect to FIG. 15, is performed a priori. This training includes training sequence generation, inverse channel response estimation, pre-equalized training sequence generation and LUT generation. One example training sequence may be long enough to include every possible symbol pattern in a given run length (e.g., a 3-symbol run).

Further at the transmitter-side 1600, a transmission subsystem 1604 may generate information bits using a signal generation module that may generate random bit patterns for testing and may receive information bits such as user data and other network traffic for transmission to the receiver side. The symbols may be gray coded prior to transmission, as is known in the art. The gray coded symbols may then undergo pre-distortion and pre-equalization using the values determined from the a priori calculations. The pre-distortion may be applied to the individual signal values as an additive correction to the symbols. The pre-equalization may be performed by filtering the symbols through a filter that represents the inverse channel transfer function. The filter may be a linear filter that may be a finite impulse response (FIR) filter of an infinite impulse response (IIR) filter. As disclosed herein, the use of training assisted pre-compensations and both transmitter and receiver based LUT are advantageously used to mitigate channel bandwidth constraint and component nonlinearity impairment.

At the transmitter-side 1600, the generated symbols are then processed through a digital to analog convertor (DAC 1606) and through gain adjusting drivers to I-Q modulated and polarization division multiplex generated modulated optical signals.

The optical signal is passed through an optical channel to a receiver. In the experiments performed by the inventors, a TeraWave loop was used to simulate about 100 kilometer optical channel. The signal is then received at a receiver 1652 where the received signal at an optical front end which may be, e.g., an integrated coherent receiver (ICR) which receives a local clock signal from a local oscillator (LO). The signal is then polarization division de-multiplexed and converted into digital domain (electrical) using an analog to digital convertor.

Additional signal processing functions may be implemented in the digital domain using a digital signal processor 1654 or alternately performed using a mixture of electronic circuits and processor based software implementations. These include, de-skewing the received signal to restore orthogonality, estimating chromatic dispersion (CD) and compensating using the estimate, a digital phase lock loop for clock recovery, an optimization algorithm to minimize a measure of error, e.g., DD-LMS or constant modulus algorithm (CMA). As discussed above, receiver-side LUT correction may be used to compensate for non-linearity.

Example Embodiments of Inverse Channel Response Estimation and LUT Generation

Figure 17:
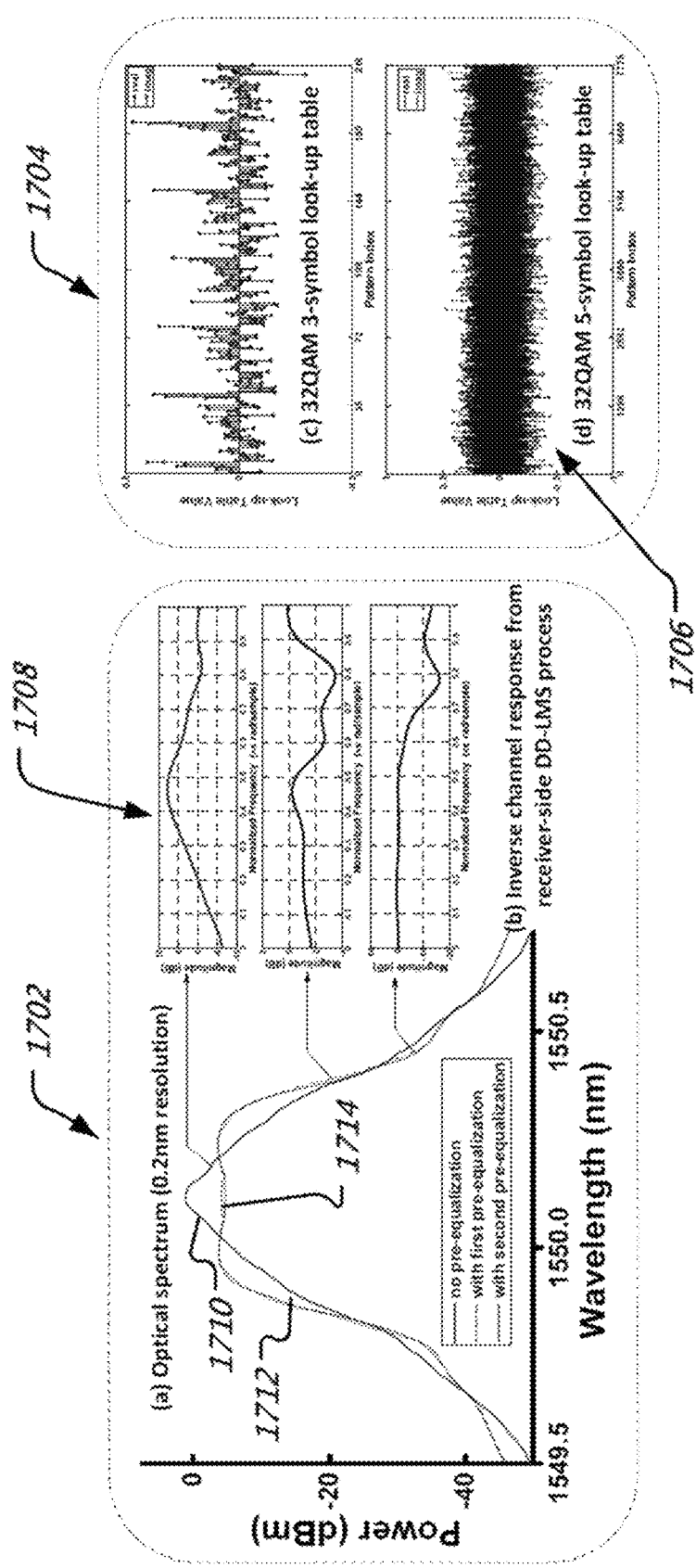
FIG. 17 shows examples of spectrum of optical signals in the joint optimization system.

FIG. 17 shows example results obtained by inventors by performing simulations for the theoretical curve and simulations performed on the setup depicted in FIGS. 16A and 16B. Graph 1702 shows three spectra, without pre-equalization (1710), with first iteration of pre-equalization (1712) and with second iteration of pre-equalization (1714). Graph 1708 shows the corresponding magnitude versus normalized frequency curves of the estimated inverse channel response. As shown in graphs 1702 and 1708, then a flat channel response is obtained after two cascade pre-equalizations. The curves 1710, 1712, 1714 also show that the iterations quickly converge and by second iteration, a relatively flat optical spectrum is achieved, indicating that the inverse channel transfer function is a good estimate.

Graph 1704 shows an example of a 3-symbol look-up table when each symbol is from a 32 QAM constellation. Graph 1706 shows an example of a 5-symbol look-up table, with each symbol being from a 32 QAM constellation. The horizontal axis in the case of 3-symbols for 32 QAM comprises 216 data points ($6^3$=216 patterns) and for 5-symbols, comprises 7,776 data points ($6^5$=7776 patterns), corresponding to the entries of LUT in a memory. The number of distinct symbols may depend on the number of values of symbols for each polarization. For example, for 32 QAM, 6 values may be possible for each symbol [5 3 1 −1 −3 −5].

Examples of Bit Error Rate Results

Figure 18:
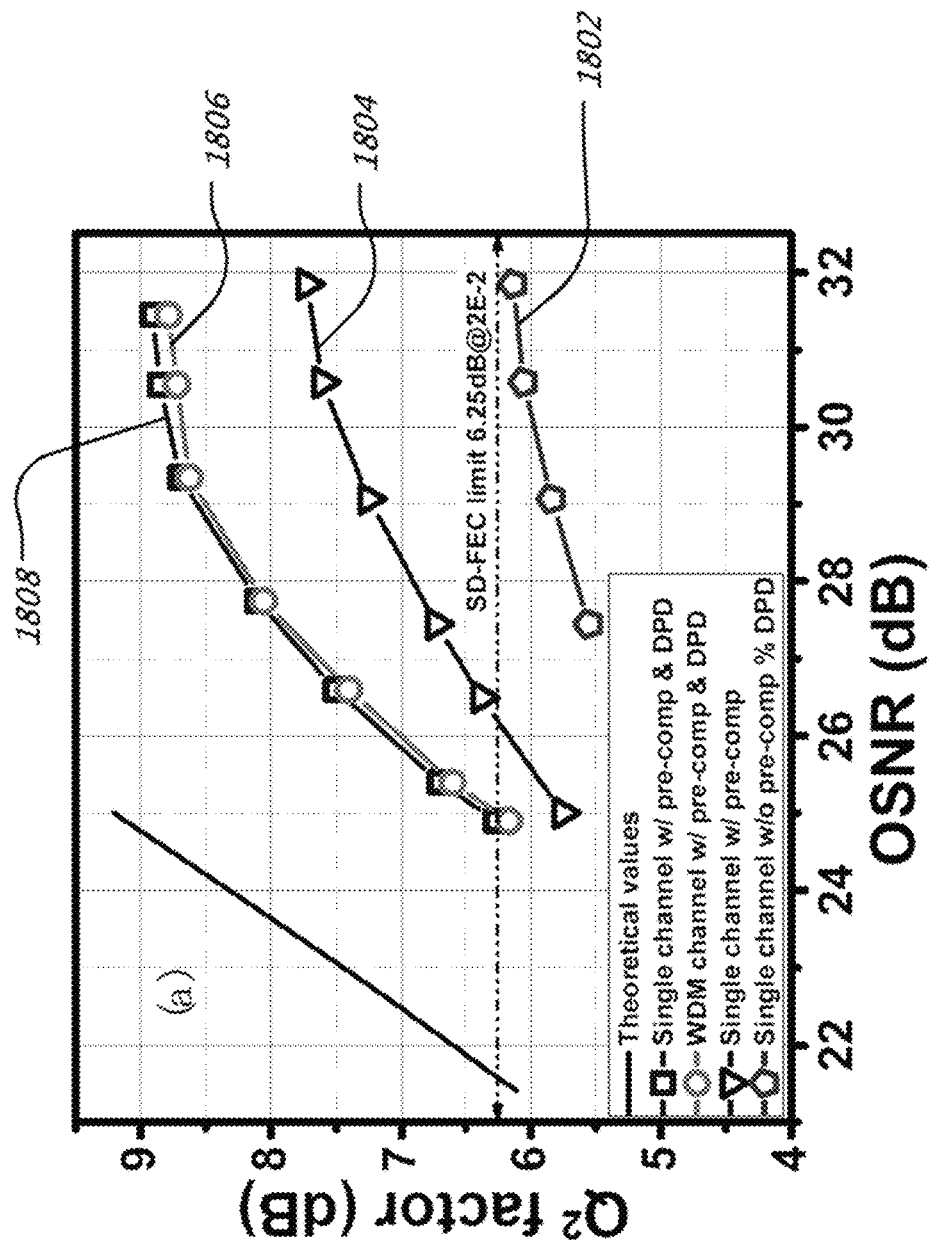
FIG. 18 is a graph depicting example simulation and experimental results.

FIG. 18 shows the BTB Q2-factor results of 51.25-GBaud PDM-32QAM signals as a function of OSNR (0.1 nm resolution). A low Q2-factor floor exists when there is no pre-equalization and pre-distortion process (curve 1802), and significant OSNR improvement is observed when using the cascade pre-equalization process (curve 1804). Experiments performed by the inventors also show that pre-distortion can further improve the system performance (1806, 1808) by 1.2-dB in required OSNR at the soft-decision (SD)-FEC limit (Q2=6.25 corresponding to BER=2.0×10−2). The required OSNR for WDM PDM-32QAM channel in 65-GHz grid at the SD-FEC limit is about 25 dB/0.1 nm, which has less than 0.25-dB OSNR penalty compared to single-carrier case.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a receiver in an optical communication network, comprising:
    receiving, over an optical channel, an optical signal carrying modulated information bits;
    processing the optical signal through a receiver subsystem to generate a stream of digitized modulation symbols from the optical signal; and
    producing, using the stream of digitized modulation symbols as input symbols to an iterative process, estimates of information bits by, in each iteration:
        generating estimated output symbols from the input symbols by filtering by an estimate of inverse of the optical channel;
        updating, using the estimated output symbols, the estimate of the inverse of the optical channel to minimize a measure of error; and
        compensating the estimated output symbols by using pre-distortion values from a look-up table (LUT) to generate compensated output symbols that are used as input to a next iteration.

2. The method of claim 1, wherein the using the pre-distortion values from the LUT includes accessing an entry of the LUT based on a pattern of the output symbols.

3. The method of claim 1, wherein the optical signal includes polarization domain multiplexed signal components and wherein the processing includes:
    polarization domain de-multiplexing the optical signal prior to generating the stream of digitized modulation symbols.

4. The method of claim 1, and wherein the measure of error is a least mean squares measure, and wherein the updating is performed using a decision directed least mean squares (DD-LMS) algorithm.

5. The method of claim 1, wherein the compensating includes generating the compensated output symbols by adding pre-distortion values from the LUT to the estimated output symbols.

6. The method of claim 1, further including:
determining entries of the LUT based on a priori signal calibration by received known calibration signals.

7. The method of claim 2, wherein the pattern on the output symbols includes an odd number of output symbols.

8. The method of claim 3, wherein the using the pre-distortion values from the LUT includes accessing an entry of the LUT based on a pattern of the output symbols, the method further including:
storing a different set of entries of the LUT for each polarization domain component, wherein the set of entries for a given polarization component takes into account contribution of symbol patter configuration from another polarization domain component.

9. A receiver apparatus for operation in an optical communication network, comprising:
an optical front end that receives, over an optical channel, an optical signal carrying modulated information bits;
a receiver subsystem that processes the optical signal to generate a stream of digitized modulation symbols from the optical signal;
a memory that stores instructions; and
a digital signal processor that:
generates estimated output symbols from input symbols by filtering by an estimate of inverse of the optical channel, wherein the input symbols are produced based on the stream of digitized modulation symbols;
updates, using the estimated output symbols, the estimate of the inverse of the optical channel to minimize a measure of error; and
compensates the estimated output symbols by using pre-distortion values from a look-up table (LUT) to generate compensated output symbols that are used as input to a next iteration.

10. The apparatus of claim 9, wherein the using the pre-distortion values from the LUT includes accessing an entry of the LUT based on a pattern of the output symbols.

11. The apparatus of claim 9, wherein the optical signal includes polarization domain multiplexed signal components and wherein the processing includes:
polarization domain de-multiplexing the optical signal prior to generating the stream of digitized modulation symbols.

12. The apparatus of claim 9, and wherein the measure of error is a least mean squares measure, and wherein the digital signal processor updates the estimate of the inverse of the optical channel using a decision directed least mean squares (DD-LMS) algorithm.

13. The apparatus of claim 9, wherein the digital signal processor generates the compensated output symbols by adding pre-distortion values from the LUT to the estimated output symbols.

14. The apparatus of claim 9, wherein the digital signal processor further determines entries of the LUT based on a priori signal calibration by received known calibration signals.

15. The apparatus of claim 10, wherein the pattern on the output symbols includes an odd number of output symbols.

16. The apparatus of claim 11, wherein the using the pre-distortion values from the LUT includes accessing an entry of the LUT based on a pattern of the output symbols and wherein the digital signal processor further performs:
storing a different set of entries of the LUT for each polarization domain component, wherein the set of entries for a given polarization component takes into account contribution of symbol patter configuration from another polarization domain component.

17. An optical communication receiver apparatus, comprising:
a first memory that stores look up table (LUT) values sorted according to symbol patterns, wherein each LUT value corresponds to an amount of additive correction;
a second memory that stores instructions; and
a processor that reads the instructions from the second memory and implements a data reception method, wherein the instructions include:
instructions for operating an optical front end to receive, over an optical channel, an optical signal carrying modulated information bits;
instructions for operating a receiver subsystem to process the optical signal to generate a stream of digitized modulation symbols from the optical signal;
instructions for generating estimated output symbols from input symbols by filtering by an estimate of inverse of the optical channel, wherein the input symbols are produced based on the stream of digitized modulation symbols;
instructions for updating, using the estimated output symbols, the estimate of the inverse of the optical channel to minimize a measure of error; and
instructions for compensating the estimated output symbols by the amount of additive correction.

18. The apparatus of claim 17, wherein the instructions for updating include instructions for performing a least mean square optimization.

19. The apparatus of claim 17, wherein the optical signal includes polarization domain multiplexed signal components and wherein the processing the optical signal includes:
polarization domain de-multiplexing the optical signal prior to generating the stream of digitized modulation symbols.

20. The apparatus of claim 18, wherein the pattern on the output symbols includes an odd number of output symbols.

* * * * *